United States Patent
Leonard et al.

(10) Patent No.: US 10,161,471 B2
(45) Date of Patent: Dec. 25, 2018

(54) SUSPENSION SYSTEMS AND METHODS OF OPERATING SAME

(71) Applicant: Firestone Industrial Products Company, LLC, Indianapolis, IN (US)

(72) Inventors: Joshua R. Leonard, Noblesville, IN (US); Pradipta N. Moulik, Carmel, IN (US); Graham R. Brookes, Noblesville, IN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 5 days.

(21) Appl. No.: 15/329,684

(22) PCT Filed: Jul. 29, 2015

(86) PCT No.: PCT/US2015/042675
§ 371 (c)(1),
(2) Date: Jan. 27, 2017

(87) PCT Pub. No.: WO2016/019027
PCT Pub. Date: Feb. 4, 2016

(65) Prior Publication Data
US 2017/0211649 A1    Jul. 27, 2017

Related U.S. Application Data

(60) Provisional application No. 62/030,506, filed on Jul. 29, 2014.

(51) Int. Cl.
*B60G 11/27* (2006.01)
*F16F 9/04* (2006.01)
(Continued)

(52) U.S. Cl.
CPC ............ *F16F 9/0472* (2013.01); *B60G 11/27* (2013.01); *B60G 13/10* (2013.01); *B60G 15/12* (2013.01);
(Continued)

(58) Field of Classification Search
CPC ........... F16F 9/0472; F16F 9/04; B60G 11/27; B60G 15/12; B60G 2202/152; B60G 2400/51222
See application file for complete search history.

(56) References Cited

U.S. PATENT DOCUMENTS 1,884,477 A * 10/1932 Wood ................... F16F 9/0472
267/35
4,325,541 A * 4/1982 Korosladanyi ........ B60G 11/27
267/220
(Continued)

FOREIGN PATENT DOCUMENTS

DE    102008047801    1/2010
WO    WO 2013/165238    6/2010

OTHER PUBLICATIONS

International Search Report for corresponding PCT Application No. PCT/US2015/042675 dated Dec. 16, 2015.

*Primary Examiner* — Drew J Brown
(74) *Attorney, Agent, or Firm* — Brian D. McAlhaney; Fay Sharpe LLP

(57) ABSTRACT

Suspension systems include a gas spring and gas damper assembly that is adapted for operation in first and second conditions. In the first condition, the assembly provides spring and damping functionality across a first range of travel. In the second condition, the assembly provides actuator functionality with a second range of travel that is substantially less than the first range of travel. A pressurized gas system is in fluid communication with the assembly. A control system is in communication with the assembly and
(Continued)

the pressurized gas system. The control system is operative to actuate one or more control devices to transfer pressurized gas and thereby transition the assembly from between the first and second conditions. Methods of operating such as suspension system are also included.

20 Claims, 24 Drawing Sheets

(51) Int. Cl.
 B60G 13/10 (2006.01)
 B60G 15/12 (2006.01)
 B60G 17/052 (2006.01)
(52) U.S. Cl.
 CPC ....... *B60G 17/052* (2013.01); *B60G 17/0521* (2013.01); *B60G 2202/152* (2013.01); *B60G 2204/4502* (2013.01); *B60G 2206/42* (2013.01); *B60G 2300/02* (2013.01); *B60G 2400/51222* (2013.01); *B60G 2500/30* (2013.01); *F16F 9/04* (2013.01)

(56) References Cited

U.S. PATENT DOCUMENTS

| 4,712,776 | A  | * | 12/1987 | Geno    | B60G 15/14 188/322.12 |
| 6,752,250 | B2 | * | 6/2004  | Tanner  | B60G 13/14 188/267 |
| 7,644,943 | B2 | * | 1/2010  | Hayes   | B60G 11/27 267/64.16 |
| 9,770,958 | B2 | * | 9/2017  | Leonard | B60G 15/12 |
| 2006/0006590 | A1 | * | 1/2006 | Brookes | B60G 13/003 267/64.27 |
| 2010/0133771 | A1 | | 6/2010 | Hudson  | |
| 2010/0289197 | A1 | * | 11/2010 | Leonard | B60G 11/27 267/113 |
| 2011/0140324 | A1 | | 6/2011 | Naber   | |
| 2014/0070468 | A1 | | 3/2014 | Leonard | |

* cited by examiner

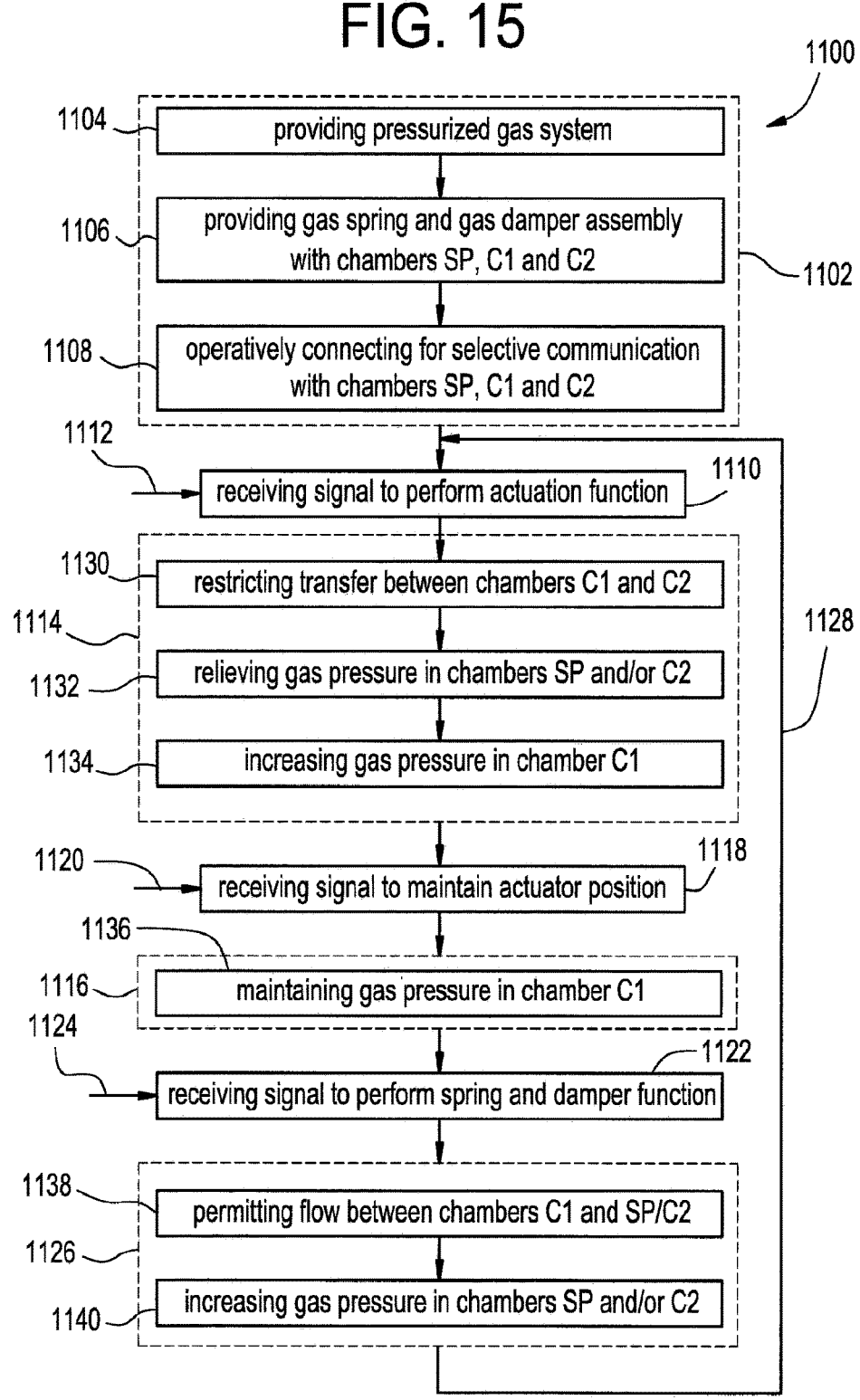

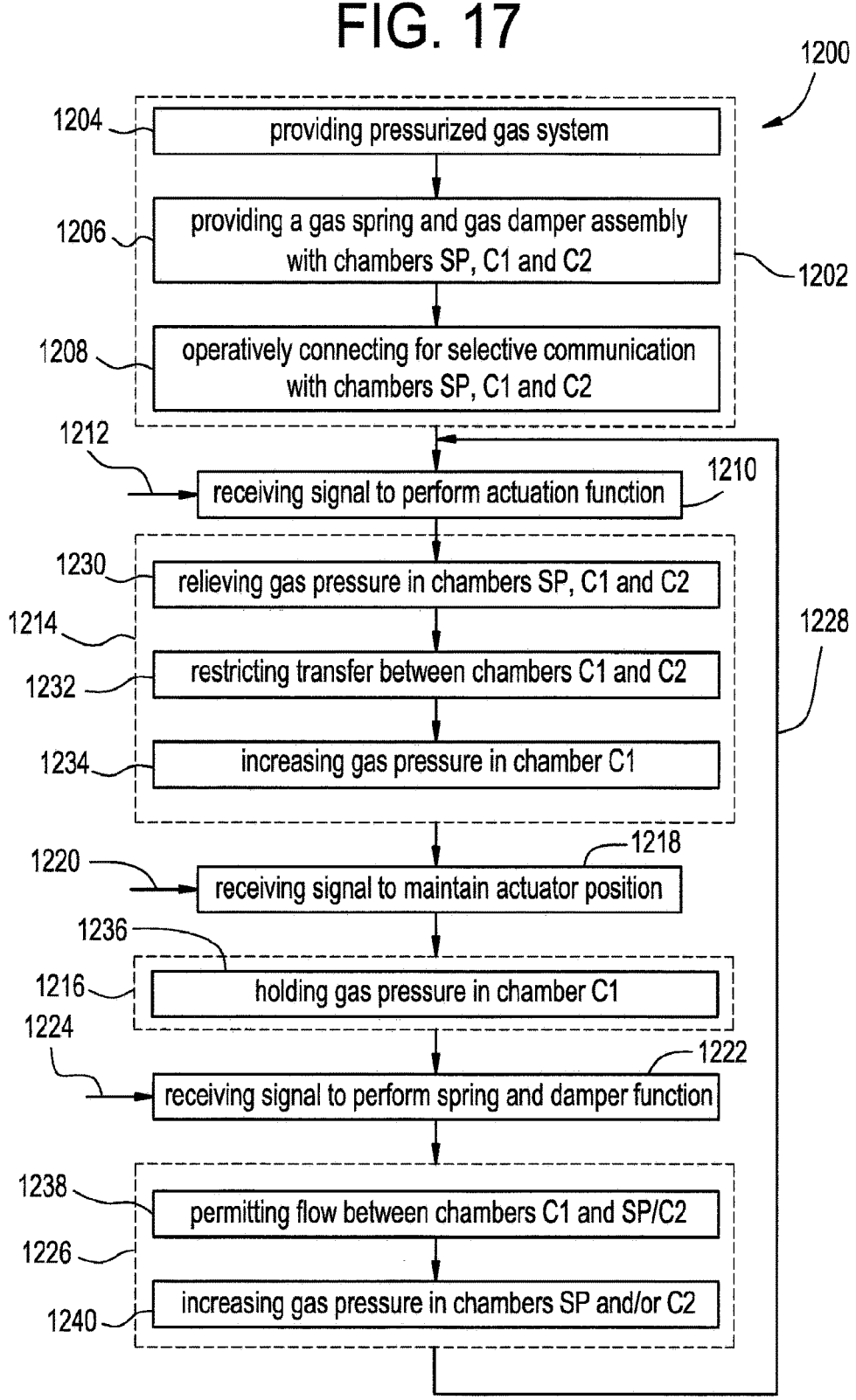

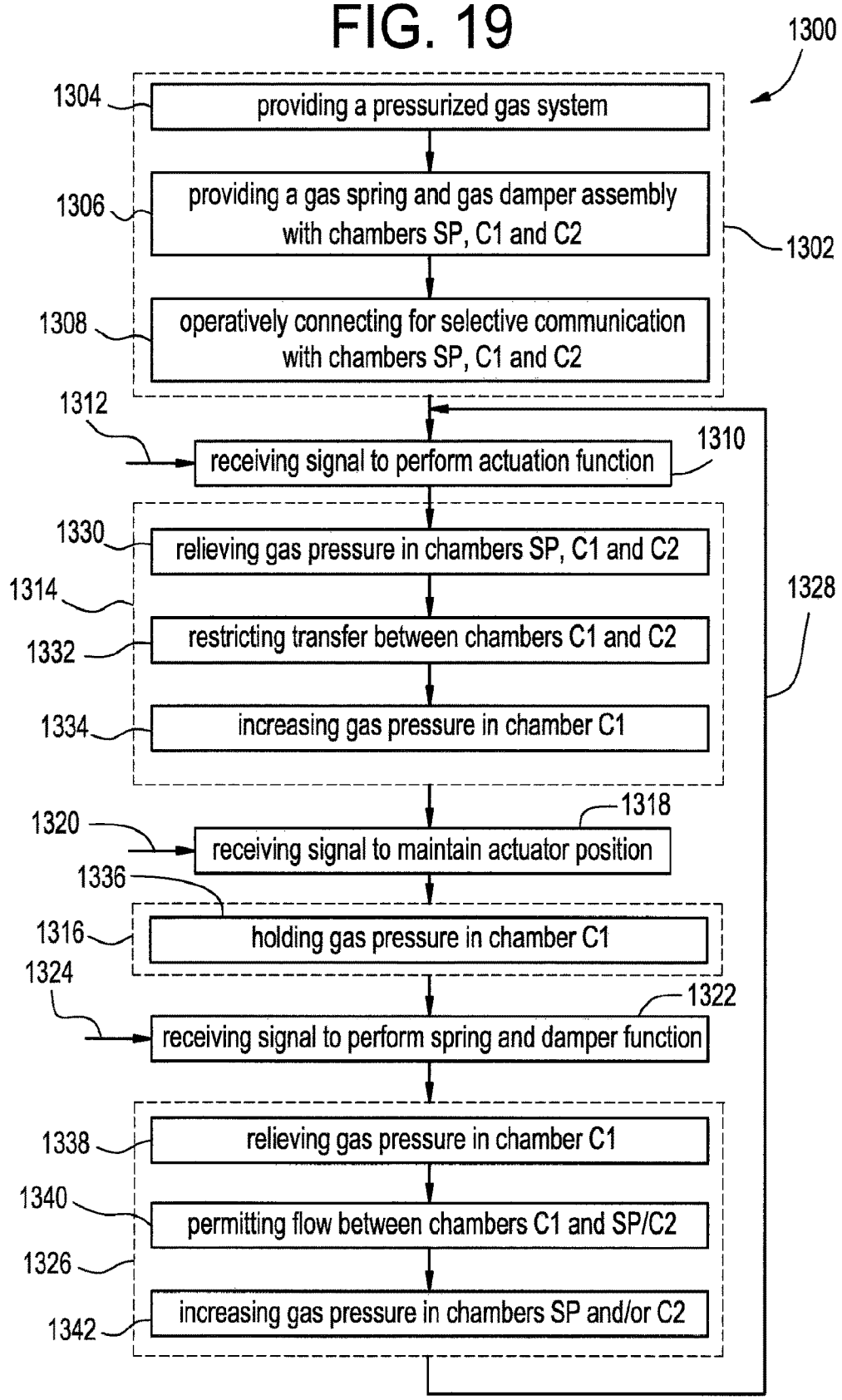

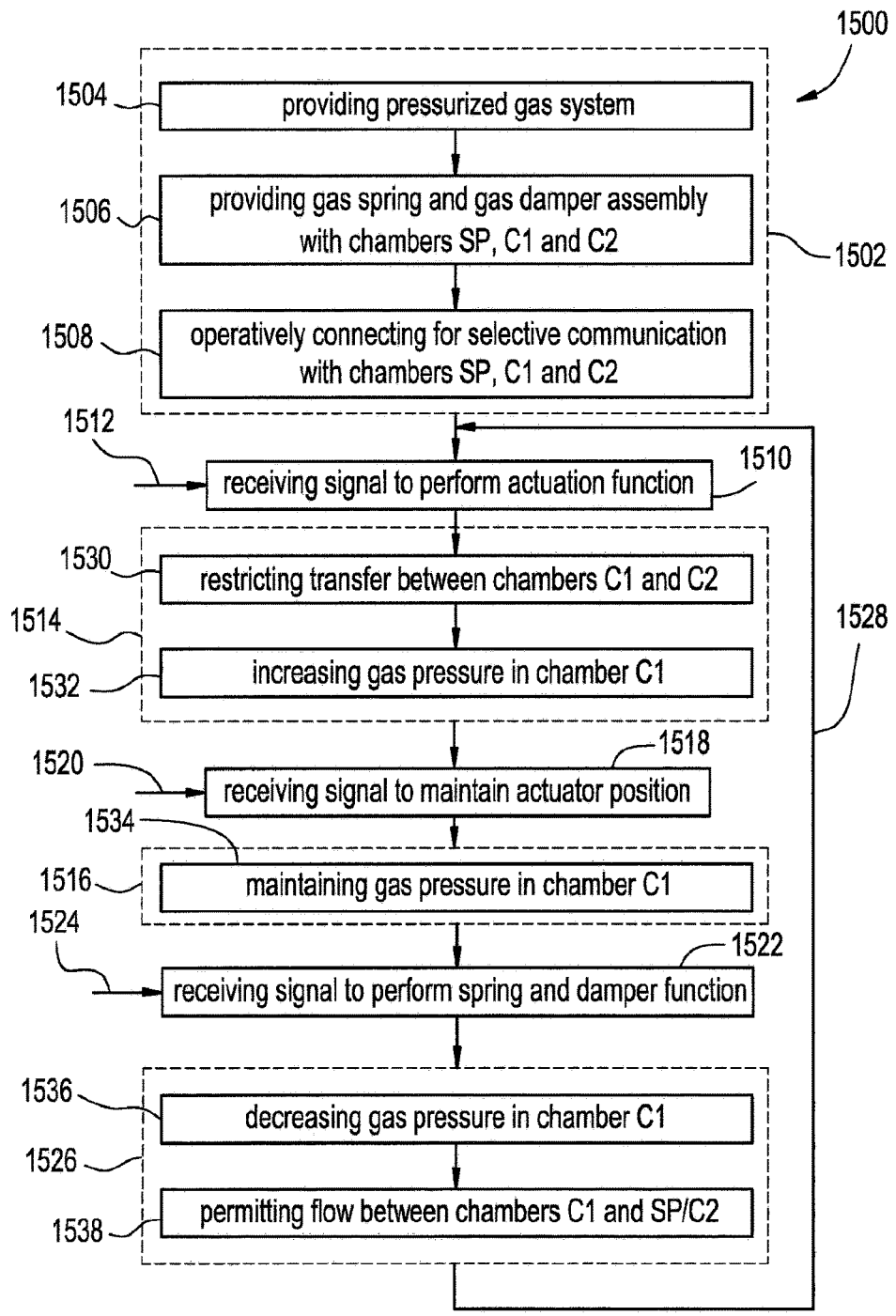

SUSPENSION SYSTEMS AND METHODS OF OPERATING SAME

BACKGROUND

The subject matter of the present disclosure broadly relates to the art of suspension systems disposed between sprung and unsprung masses and, more particularly, to suspension systems that can include one or more gas spring and gas damper assemblies as well as a pressurized gas system and a control system operative to selectively transition the one or more gas spring and gas damper assemblies between a spring and damper functionality and an actuator functionality. Methods of operating such suspension systems are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with suspension systems for non-wheeled vehicles and/or support structures and height adjusting systems associated with industrial machinery, components thereof and/or other such equipment. Accordingly, the subject matter of the present disclosure is not intended to be limited to applications and/or uses associated with suspension systems of wheeled vehicles, which as discussed herein are merely exemplary.

Wheeled motor vehicles of most types and kinds include a sprung mass, such as a body or chassis, for example, and an unsprung mass, such as two or more axles or other wheel-engaging members, for example, with a suspension system disposed therebetween. Typically, such a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In some cases, a vehicle or other installation, such as has been referred to above, can include a suspension system with components and/or assemblies that are selectively deployable, such as by being capable of selective extension and retraction relative to an associated sprung or unsprung mass. In many cases, such selectively deployable assemblies take the form of axle and wheel sets that are commonly referred to as lift axles. Non-limiting examples of vehicles that can include one or more selectively deployable axle and wheel sets can include over-the-road tractors, over-the-road trailers, dump trucks and concrete mixing trucks. In some cases, such axle and wheel sets can be selectively deployed by a vehicle operator, such as by providing additional support to the body by engaging the wheels with the road surface and thereby increasing the load capacity of the vehicle or re-distributing the weight or load on the truck or trailer.

A variety of suspension systems have been devised and are commonly used to operatively connect an unsprung mass (e.g., a lift axle) to a sprung mass (e.g., a truck or trailer body). Commonly, selectively actuatable suspension systems include one or more springs that bias the lift axle into an extended position under in a deployed condition of the suspension system. In many cases, known suspension systems also include one or more dampers that are operative in the deployed condition of the lift axle and act to dissipate energy associated with undesired inputs and movements of the sprung mass, such as road inputs occurring under dynamic operation of a vehicle, for example. Typically, such dampers are liquid filled and operatively connected between the sprung and unsprung masses, such as between the truck or trailer body and the lift axle, for example. One example of such damping components are conventional shock absorbers that are commonly used in vehicle suspension systems.

One disadvantage of known constructions is that the one or more dampers that are operatively connected between the sprung and unsprung masses are often used only in deployed condition of the selectively actuatable suspension system. As described above, in a deployed condition, the one or more dampers act to dissipate kinetic energy acting on the vehicle or other installation. In a retracted condition, however, the one or more dampers may be collapsed into a non-functioning condition and, thus, represent added weight that can reduce the transportable payload of an associated vehicle.

Additionally, it will be appreciated that conventional constructions typically include primary springs that function to actuate the suspension system into a deployed condition and also provide the primary biasing or spring force for the suspension system in the deployed condition. In many cases, known suspension systems are constructed such that the primary springs are largely incapable of lifting or otherwise retracting the lift axle or other unsprung mass from the deployed position into a storage condition. As such, conventional constructions commonly include one or more secondary springs that are selectively actuatable to retract the suspension system from a deployed condition. In addition to the added weight of the secondary springs and the associated components, such secondary springs can contribute to increased costs, added maintenance, increased space usage and/or other disadvantageous characteristics of conventional suspension systems that include selectively deployable components and/or assemblies.

Notwithstanding the widespread usage and overall success of conventional suspension systems that are known in the art, it is believed that a need exists to meet these and/or other competing goals while still retaining comparable or improved performance, ease of manufacture, ease of assembly, ease of installation, reduced cost of manufacture and/or otherwise advancing the art of suspension systems.

BRIEF DESCRIPTION

One example of a suspension system in accordance with the subject matter of the present disclosure can include a gas spring and gas damper assembly that is securable between an associated sprung mass and an associated unsprung mass. The assembly can be adapted operate in a first condition in which the assembly provides spring and damping functionality across a first range of travel and a second condition in which the assembly provides actuator functionality with a second range of travel that is substantially less than the first range of travel. A pressurized gas system in fluid communication with the assembly. A control system in communication with at least one of the assembly and the pressurized gas system. The control system can be operative to receive a signal initiating a transition of the assembly from the first condition to the second condition. The control system can also be operative to actuate one or more control devices operatively associated with at least one of the assembly and the pressurized gas system to transfer pressurized gas within the assembly and thereby transition the assembly from the first condition to the second condition. The control system can be further operative to maintain the assembly in the second condition for an indeterminate period of time. The control system can also be operative to receive a signal initiating a transition of the assembly from the second condition to the first condition. The control system can be further operative to actuate one or more control devices operatively associated with at least one of the assembly and the pressurized gas system to transfer pressurized gas within the assembly and thereby transition the assembly from the second condition to the first condition.

One example of a method of operating a suspension system in accordance with the subject matter of the present disclosure can include providing a suspension system that includes a gas spring and gas damper assembly and a pressurized gas system. The assembly can be securable between an associated sprung mass and an associated unsprung mass. The assembly can be adapted operate in a first condition in which the assembly provides spring and damping functionality across a first range of travel and in a second condition in which the assembly provides actuator functionality with a second range of travel that is substantially less than the first range of travel. The pressurized gas system can be disposed in fluid communication with the assembly. The method can also include initiating a transition of the assembly from the first condition to the second condition and can include maintaining the assembly in the second condition for an indeterminate period of time. The method can further include initiating a transition of the assembly from the second condition to the first condition.

BRIEF DESCRIPTION OF THE DRAWINGS

FIG. 15 is a graphical representation of one example of a method of operating a suspension system in accordance with the subject matter of the present disclosure.

FIG. 17 is a graphical representation of another example of a method of operating a suspension system in accordance with the subject matter of the present disclosure.

FIG. 19 is a graphical representation of still another example of a method of operating a suspension system in accordance with the subject matter of the present disclosure.

FIG. 23 is a graphical representation of still a further example of a method of operating a suspension system in accordance with the subject matter of the present disclosure.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
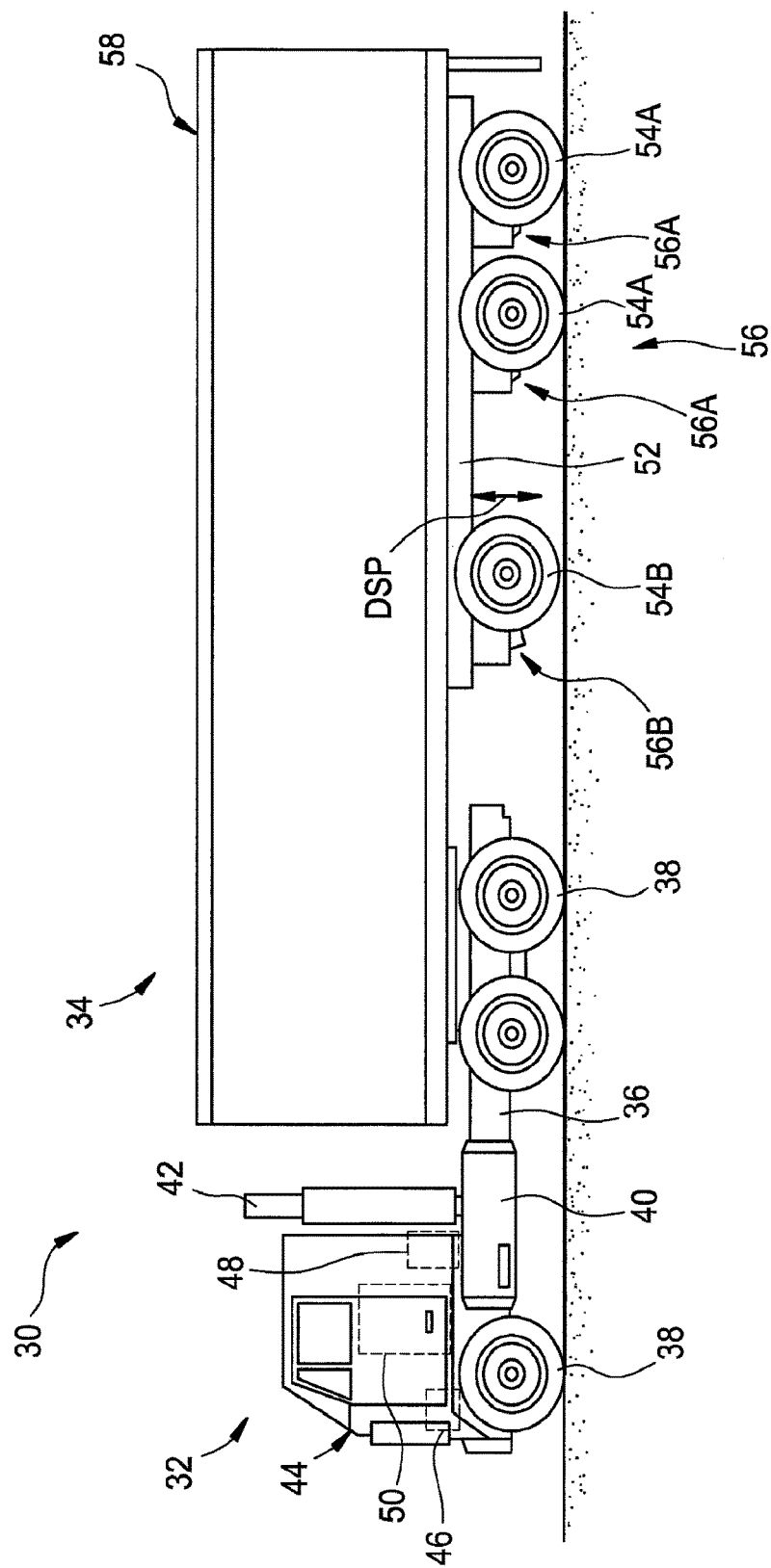
FIG. 1 is a schematic representation of one example of a vehicle that includes one or more suspension systems in accordance with the subject matter of the present disclosure.

With reference to FIG. 1, a vehicle 30 is shown as taking the form of a tractor-trailer combination that includes an over-the-road tractor 32 and a trailer 34 that is operatively connected to the tractor for over-the-road transport. Tractor 32 is shown as including a frame 36 that is supported on a plurality of wheels 38 by a tractor suspension system (not shown). Tractor 32 will typically also include an internal combustion engine (not shown) and drivetrain (not shown) that are supported on the frame and provide motive power to one or more of wheels 38. Tractor 32 can include a fuel tank 40 and an exhaust stack 42 that are operatively associated with the engine.

Figure 2:
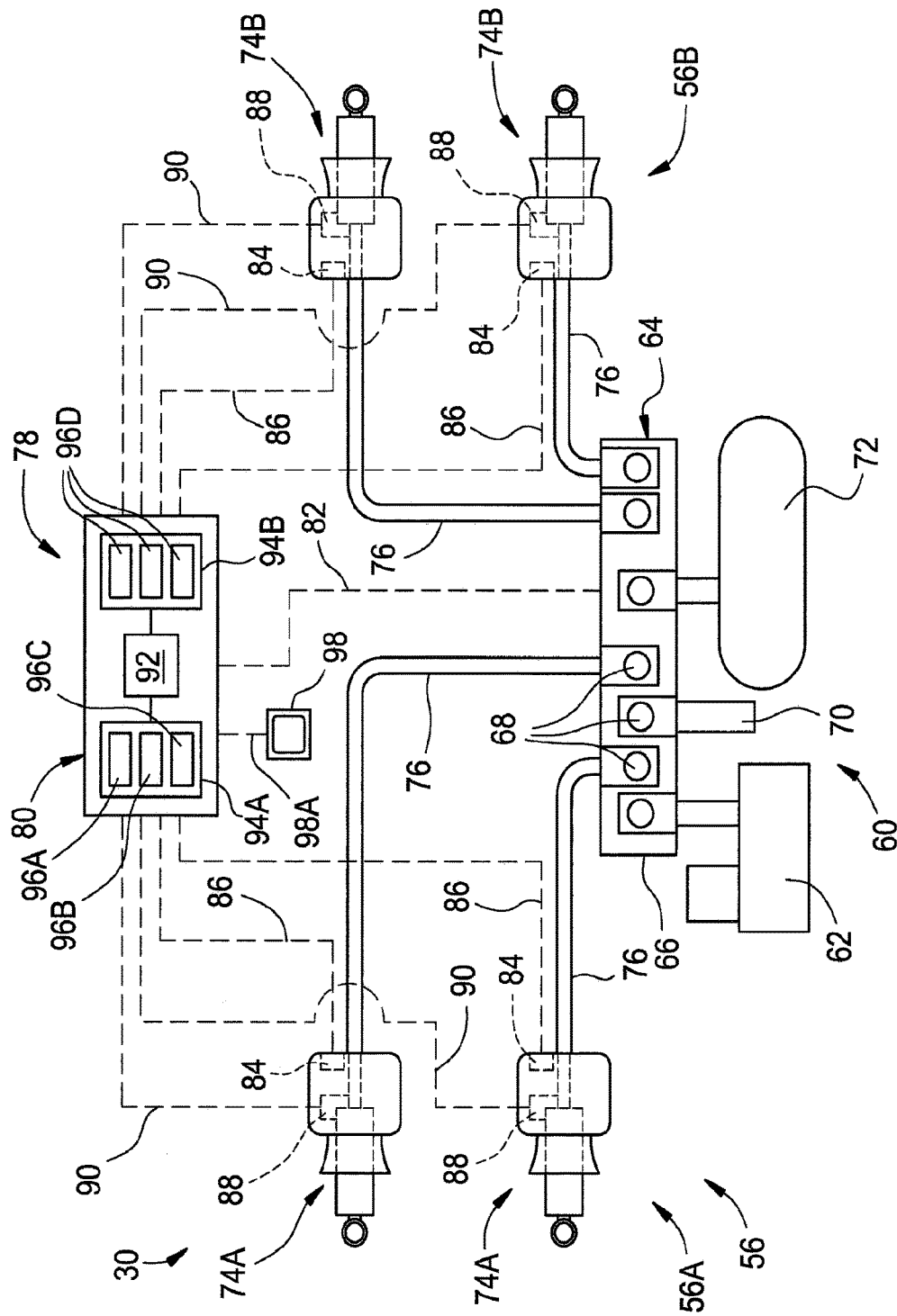
FIG. 2 is a greatly simplified schematic representation of one example of a pressurized gas system and a control system adapted for operative association with a suspension system in accordance with the subject matter of the present disclosure.
Figure 3:
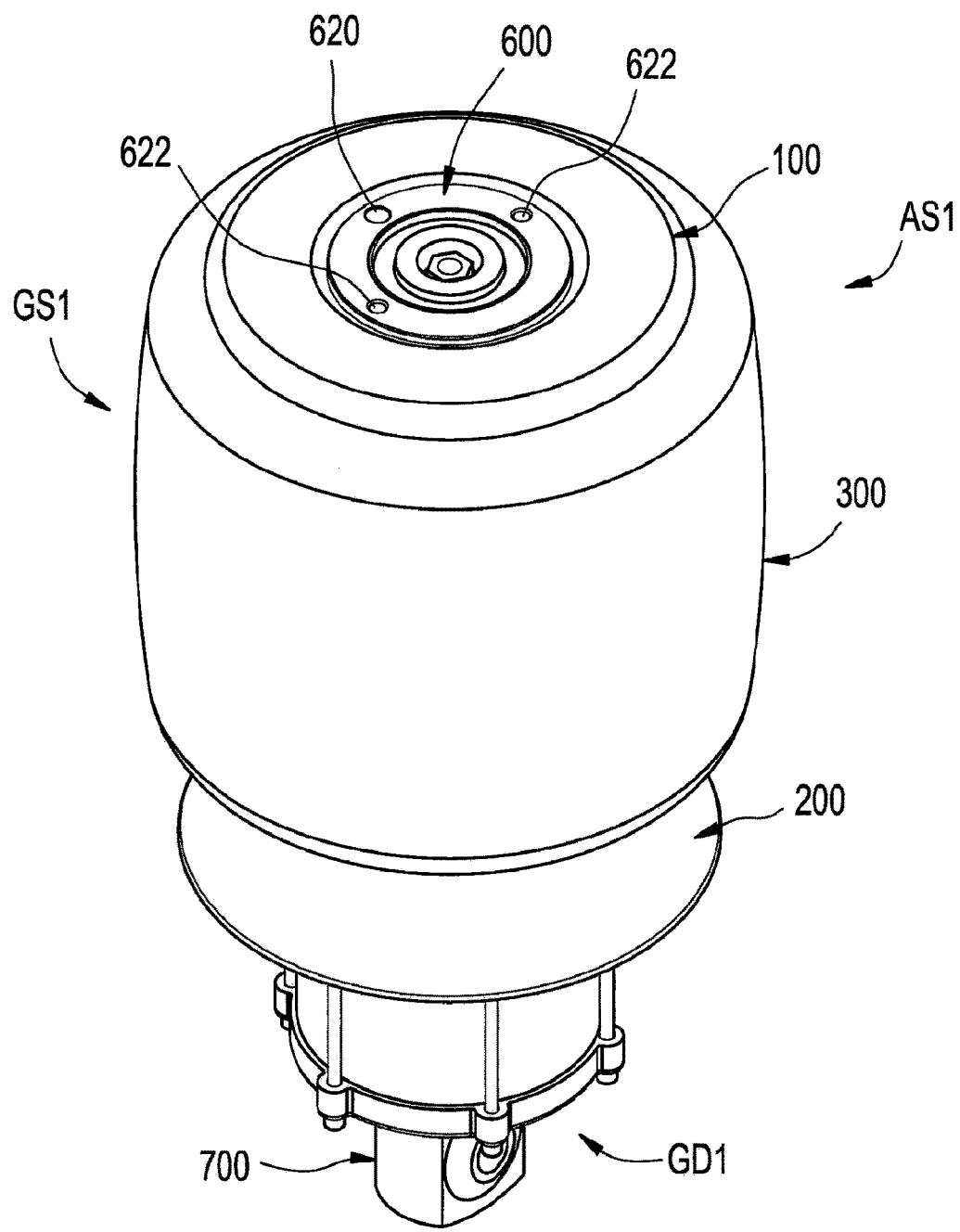
FIG. 3 is a top perspective view of one example of a gas spring and gas damper assembly adapted for use in operative association with a suspension system in accordance with the subject matter of the present disclosure.
Figure 4:
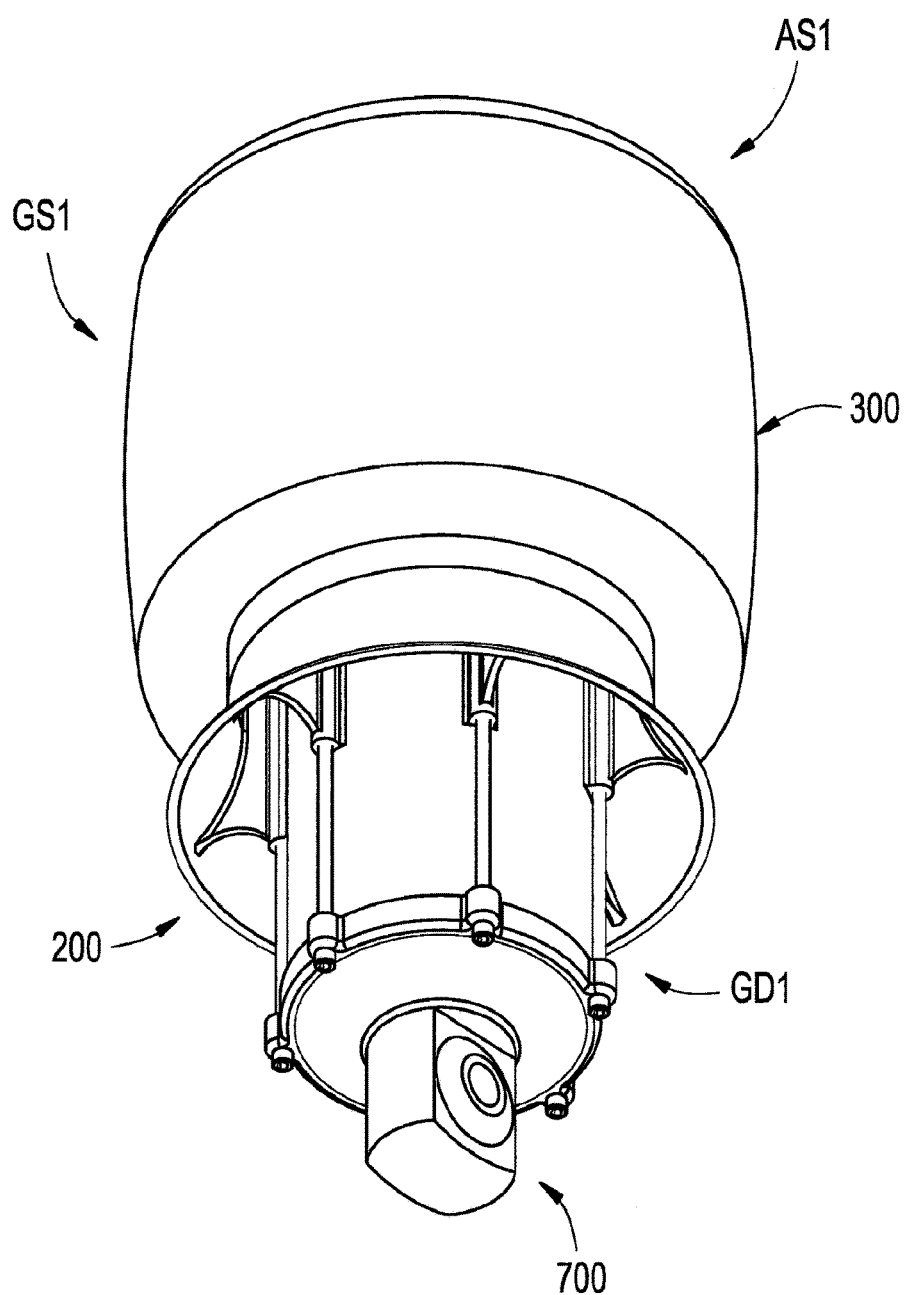
FIG. 4 is a bottom perspective view of the exemplary gas spring and gas damper assembly in FIG. 3.

Tractor 32 can also include a passenger compartment or cab 44 that can be supported on or along frame 36 in any suitable manner, such as by way of one or more cab mounts and/or one or more cab suspensions, which are respectively represented in FIG. 1 by dashed boxes 46 and 48. Typically, a cab, such as cab 44, for example, will also include one or more seats supported within the cab for use by an operator and, in some cases, one or more passengers, such as is represented in FIG. 1 by dashed box 50, for example. Trailer 34 is shown as including a frame 52 that is supported on a plurality of wheels 54A by a trailer suspension system 56. Trailer 34 can also include a trailer body 58 that is at least partially supported on frame 52 and is generally dimensioned to receive and retain a quantity of cargo. In some cases, the trailer (or other vehicle) can include two or more suspension systems, such as one or more primary (or permanently deployed) suspension systems and one or more secondary or selectively actuatable suspension systems. In other cases, trailer suspension system 56 can include two or more portions that are fluidically interconnected, communicatively coupled or otherwise operatively associated with one another. As shown in FIGS. 1 and 2, for example, trailer suspension system 56 can include one or more primary (or permanently deployed) portions, such as are represented by item numbers 56A and one or more secondary or selectively deployable portions, such as are represented in FIGS. 1 and 2 by item numbers 56B, for example. It will be appreciated that the secondary or selectively deployable portions of the suspension system can be displaced between extended (not shown) and retracted (shown in FIG. 1) positions, such as is represented in FIG. 1 by arrow DSP, for example.

It will be appreciated that numerous components and/or systems of vehicle 30 can utilize pressurized gas (e.g., air) as a power source for the operation thereof. As non-limiting examples, such components and/or systems can include a tractor suspension system, a tractor braking system, a cab suspension, a trailer suspension system and/or a trailer braking system. One greatly-simplified example of a pressurized gas system 60 that can be operatively associated with one or more of the components and/or systems of vehicle 30 is shown in FIG. 2. Pressurized gas system 60 can be operatively associated with one or more components and/or systems of the vehicle in any suitable manner for selectively supplying pressurized gas (e.g., air) thereto and selectively transferring pressurized gas therefrom.

In the exemplary embodiment shown in FIG. 2, pressurized gas system 60 includes a pressurized gas source, such as a compressor 62, for example, for generating pressurized air or other gases. A control device, such as a valve assembly 64, for example, is shown as being in communication with compressor 62 and can be of any suitable configuration or arrangement. In the exemplary embodiment shown, valve assembly 64 includes a valve block 66 with a plurality of valves 68 supported thereon. Valve assembly 64 can also, optionally, include a suitable exhaust, such as a muffler 70, for example, for venting pressurized gas from the system. Pressurized gas system 60 can also include a reservoir 72, which is shown as being in fluid communication with the compressor and/or the valve assembly and suitable for storing pressurized gas.

In some cases, the tractor suspension system and/or the trailer suspension system can include one or more gas spring and gas damper assemblies, such as, for example, two or more gas spring and gas damper assemblies 74A operatively associated with suspension system portion 56A and two or more gas spring and gas damper assemblies 74B operatively associated with suspension system portion 56B. In the arrangement shown in FIG. 2, valve assembly 64 is in communication with the gas spring and gas damper assemblies through gas transfer lines 76. As such, pressurized gas can be selectively transferred into and/or out of the gas spring and gas damper assemblies through valve assembly 64 by selectively operating valves 68.

Vehicle 30 can also include a control system 78 that is capable of communication with any one or more systems and/or components (e.g., cab mounts 46, cab suspensions 48, seat suspensions 50, suspension system portions 56A and/or 56B of suspension system 56 and/or pressurized gas system 60) of vehicle 30, such as for selective operation and/or control thereof. Control system 78 can include a controller or electronic control unit (ECU) 80 communicatively coupled with any one or more components of suspension system 56 (e.g., one or more of gas spring and gas damper assemblies 74A and/or 74B) and/or pressurized gas system 60 (e.g., compressor 62 and/or valve assembly 64). If provided, it will be appreciated that the controller can be communicatively coupled with any one or more of such systems and/or components in any suitable manner. As one example, ECU 80 can be communicatively coupled with pressurized gas system 60 by way of a conductor or lead 82, for example, for selective operation and control thereof, which can include supplying and exhausting pressurized gas to and/or from the pressurized gas system.

Control system 78 can also, optionally, include one or more height (or distance) sensing devices 84 (see also FIGS. 7 and 14), such as, for example, may be operatively associated with gas spring and gas damper assemblies 74A and/or 74B, and capable of outputting or otherwise generating data, signals and/or other communications having a relation to a height of the gas spring assemblies or a distance between other components of the vehicle. Such height sensing devices can be in communication with ECU 80, which can receive the height or distance signals, data and/or information therefrom. The height sensing devices can be in communication with ECU 80 in any suitable manner, such as through conductors or leads 86 (see also FIGS. 7 and 14), for example. Additionally, it will be appreciated that the height sensing devices can be of any suitable type, kind and/or construction.

In some cases, control system 78 can also include one or more control devices that are selectively actuatable to permit and restrict pressurized gas flow between two or more chambers within one or more of the gas spring and gas damper assemblies (e.g., gas spring and gas damper assemblies 74A and/or 74B). As shown in FIG. 2, for example, gas spring and gas damper assemblies 74A and 74B include valve assemblies 88 that are disposed in fluid communication between two or more chambers internal to assemblies 74A and 74B. While shown as being disposed internal to assemblies 74A and 74B, it will be appreciated that such control devices can be disposed in fluid communication between the two or more chambers in any suitable manner and that other configurations and/or arrangements could alternately be used without departing from the subject matter of the present disclosure. Additionally, it will be appreciated that such control devices can be in communication with the controller in any suitable manner. As one example, ECU 80 can be in communication with valve assemblies 88 through conductors or leads 90, for example.

Furthermore, a suitable control system, such as control system 78, for example, can be utilized to operate the foregoing and other systems and/or components of the vehicle and/or the suspension system, each in a suitable manner. As one example, the systems and/or components could be under direct supervision and control by controller 80, as is illustrated in FIG. 2. Alternately, the control system could optionally include one or more electronic control units that are respectively associated with individual systems and/or components. Such one or more ECUs, if provided, can be in communication with the controller and at least partially supervise and/or control the respective components and/or systems with which the ECU or ECUs are associated.

As mentioned above, the control system, such as control system 78, for example, will include a processing device, which can be of any suitable type, kind and/or configuration, such as a microprocessor, for example, for processing data, executing software routines/programs, and other functions relating to the performance and/or operation of the systems and/or components of the vehicle (e.g., cab mounts 46, cab suspensions 48, seat suspensions 50, suspension system portions 56A and/or 56B of suspension system 56 and/or pressurized gas system 60). Additionally, the control system (e.g., control system 78) will include a storage device or memory, which can be of any suitable type, kind and/or configuration that can be used to store data, values, settings, parameters, inputs, software, algorithms, routines, programs and/or other information or content for any associated use or function, such as use in association with the performance and/or operation of the system and/or components of the vehicle and/or suspension system, and/or communication with a user or operator, for example.

In the embodiment shown in FIG. 2, controller 80 includes a microprocessor 92 and a storage device or memory, which is represented in FIG. 2 by boxes 94A and 94B. In the embodiment shown, one or more modules, such as may be described hereinafter, can be implemented as software stored within memory 94A and 94B. Thus, microprocessor 92 can access memory stores 94A and 94B to retrieve and execute any one or more software modules, for example. Additionally, data, values, settings, parameters, inputs, software, algorithms, routines, programs and/or other information or content can also be retained within memory 94A and 94B for retrieval by microprocessor 92. It will be appreciated that such software routines can be individually executable routines or portions of a software program, such as an operating system, for example. Additionally, it will be appreciated that the control system, including any controller, processing device and/or memory, can take any suitable form, configuration and/or arrangement, and that the embodiments shown and described herein are merely exemplary. Furthermore, it is to be understood, however, that the modules described above in detail can be implemented in any suitable manner, including, without limitation, software implementations, hardware implementations or any combination thereof.

As mentioned above, control system 78 can optionally include any suitable number of one or more modules capable of performing one or more functions and/or providing one or more features in accordance with the subject matter of the present disclosure. It will be appreciated that any such one or more modules can include or otherwise utilize any data, values, settings, parameters, inputs, software, algorithms, routines, programs and/or other information or content for any associated use or function, such as use in association with the performance and/or operation of the system and/or components of the vehicle and/or suspension system, and/or communication with a user or operator, for example.

For example, control system 78 can include an actuation module 96A that is capable of receiving, processing, storing and/or otherwise transferring data, information, signals and/or communications relating to the transition of a gas spring and gas damper assembly (e.g., assemblies 74B) from a spring and damper function to an actuator function, such as may be suitable for use in deploying secondary suspension system portion 56B for use, such as has been described above, for example. As another example, control system 78 can include a return or de-actuation module 96B that is capable of receiving, processing, storing and/or otherwise transferring data, information, signals and/or communications relating to the transition of a gas spring and gas damper assembly (e.g., assemblies 74B) from an actuator function to a spring and damper function, such as may be suitable for use in retracting secondary suspension system portion 56B from use, such as has been described above, for example.

In some cases, actuation and de-actuation of a selectively actuatable suspension system, such as portion 56B, for example, can be performed automatically in relation to load, load distribution and/or other factors associated with a vehicle. In such cases, control system 78 can include an operating module 96C that is capable of receiving, processing, storing and/or otherwise transferring data, information, signals and/or communications relating to the actuation and de-actuation of selectively actuatable suspension systems and/or the transition of gas spring and gas damper assemblies thereof to, from and/or between actuator functionality and spring and damper functionality. Additionally, or in the alternative, control system 78 can include one or more user input components, such as a push button or selector switch 98, through which a user or operator could initiate the actuation and/or de-actuation of the selectively actuatable suspension systems and/or the transition of gas spring and gas damper assemblies thereof to, from and/or between actuator functionality and spring and damper functionality. It will be appreciated that such user input components can be in communication with the controller in any suitable manner. As one example, ECU 80 can be in communication with push button 98 through a conductor or lead 98A, for example. Furthermore, in some cases, control system 78 can also include one or more other modules 96D of any suitable type, kind and/or functionality, such as may relate to height sensing, pressure sensing and/or features of vehicle 30 and/or the systems and/or components thereof.

It will be appreciated that the tractor suspension system and trailer suspension system 56 (including portions 56A) referred to above represent the primary suspension systems of vehicle 30 by which the sprung masses, such as frame 36, cab 44, frame 52 and trailer body 58, for example, are supported on the unsprung masses of the vehicle, such as one or more axles and wheels 38 and 54A, for example. As mentioned above, a vehicle, such as vehicle 30, for example, can also include one or more secondary or other (i.e., non-primary) suspension systems that provided for increased performance and/or ride quality of the vehicle. Examples of components that can include or can be otherwise connected by way of such a secondary suspension system can include cab mounts 46 and/or cab suspensions 48 that operatively connect cab 44 with frame 36. Another example of components that can include or can be otherwise connected by way of such a secondary suspension system can include seat suspension 50 that operatively connects a seat with cab 44. A further example of components that can include or can be otherwise connected by way of such a secondary suspension system can include wheels 54B that are operatively associated with frame 52 by way of assemblies 74B of portion 56B of suspension system 56. It will be recognized and understood that a suspension system in accordance with the subject matter of the present disclosure may be suitable for use as any one or more of the foregoing and/or other examples of secondary suspension systems for vehicles and/or primary suspension systems in other applications and/or environments of use.

Figure 5:
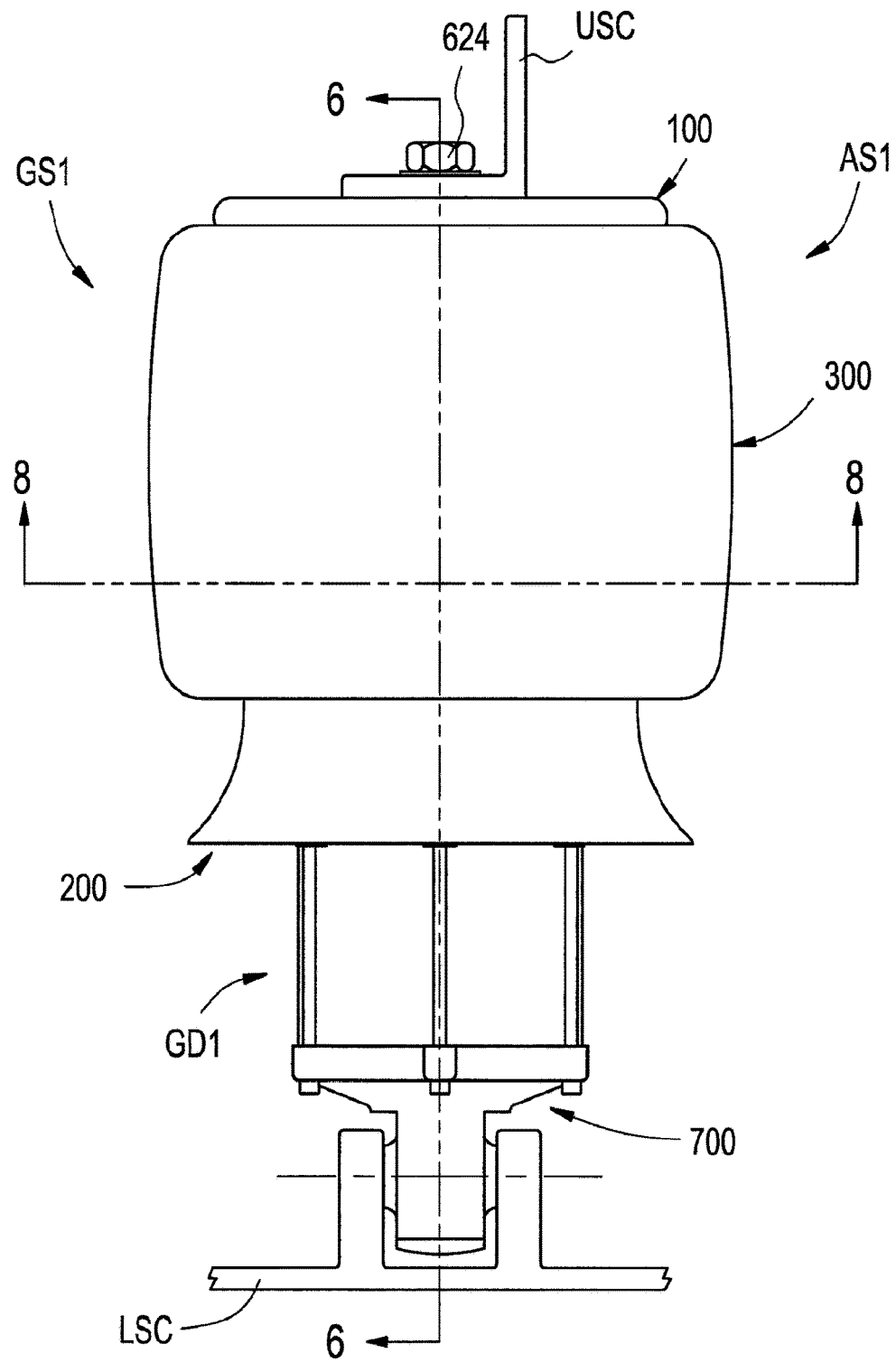
FIG. 5 is a side elevation view of the exemplary gas spring and gas damper assembly in FIGS. 3 and 4.
Figure 6:
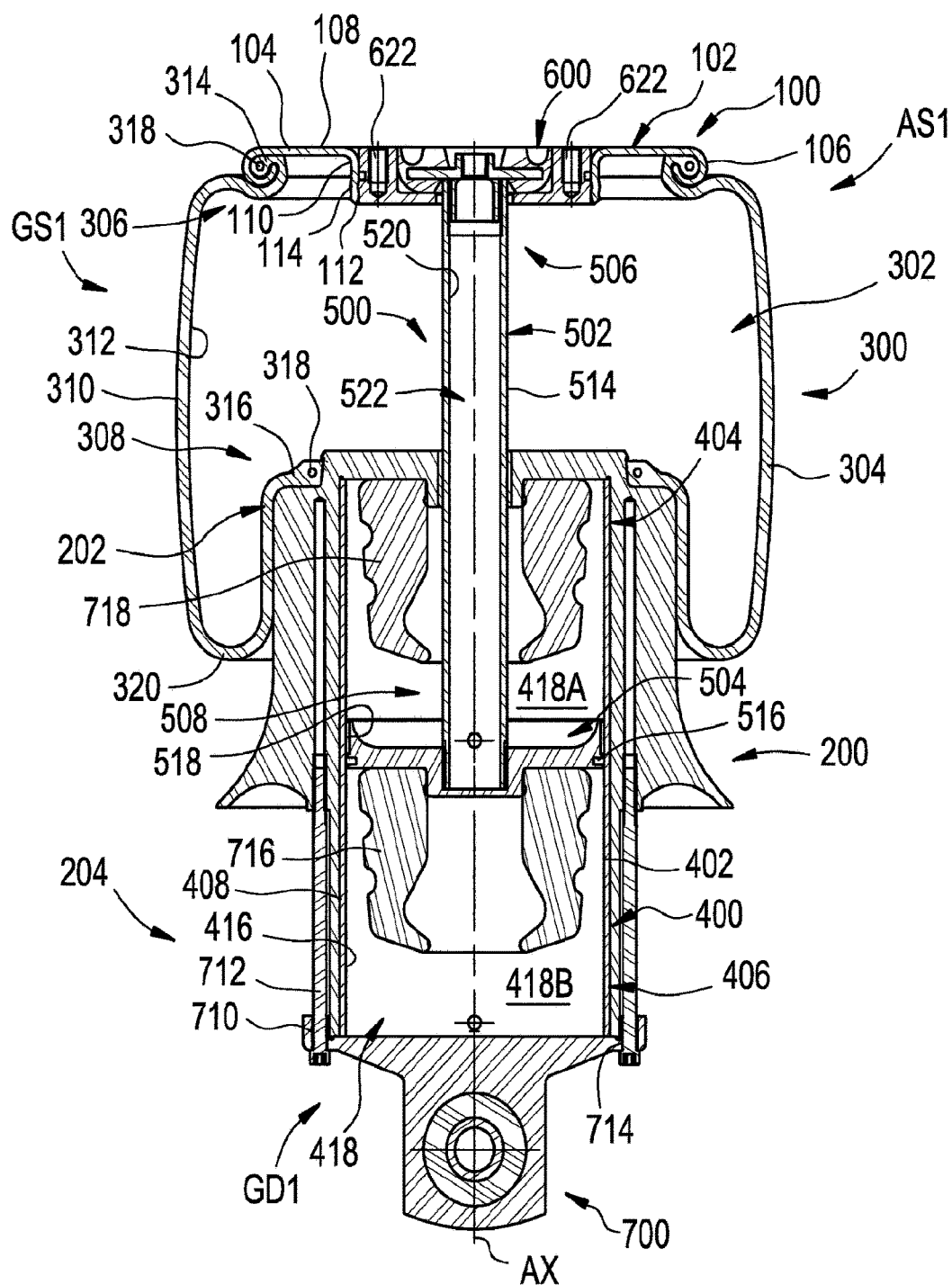
FIG. 6 is a cross-sectional side view of the exemplary gas spring and gas damper assembly in FIGS. 3-5 taken from along line 6-6 in FIG. 5.
Figure 7:
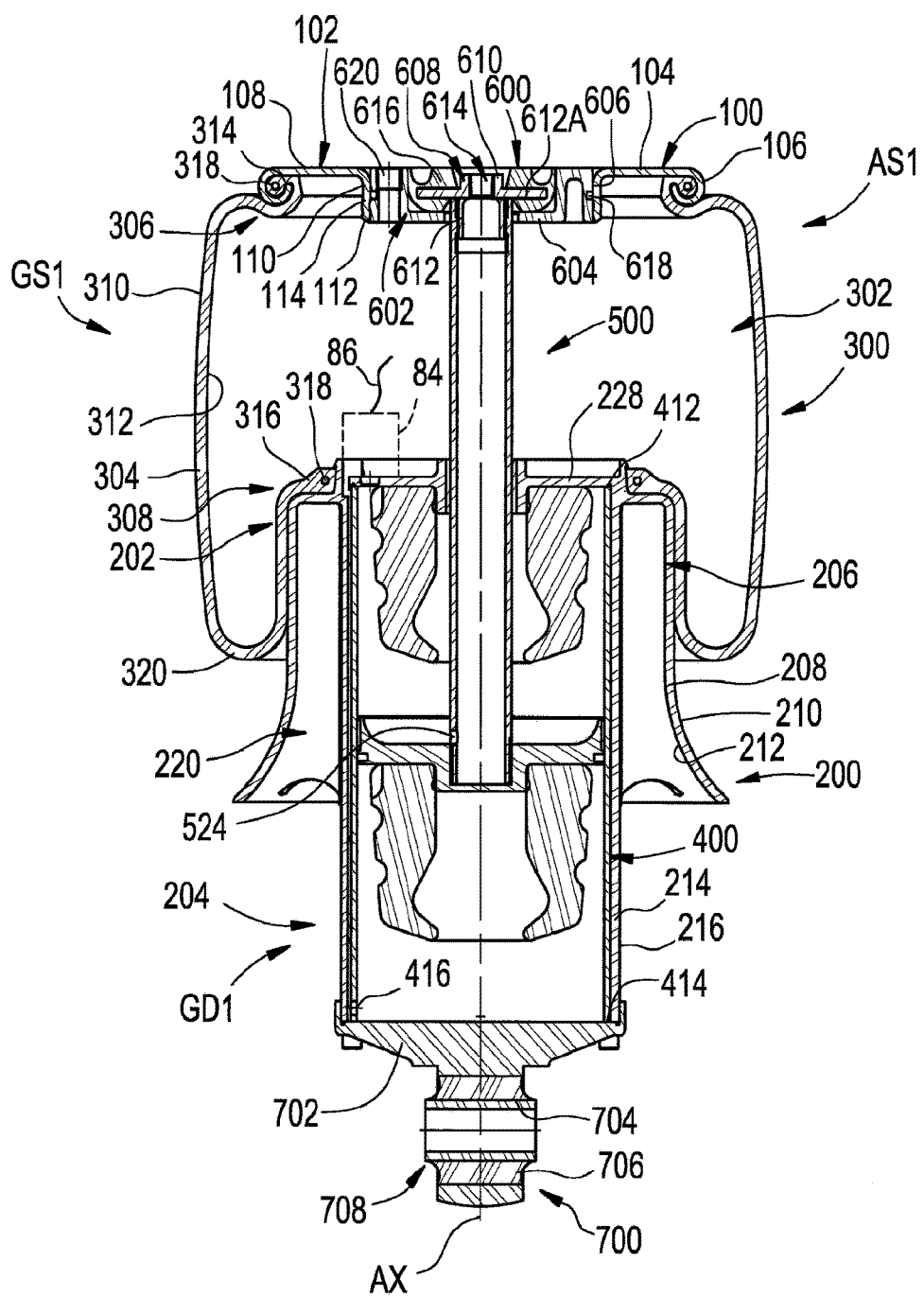
FIG. 7 is a cross-sectional side view of the exemplary gas spring and gas damper assembly in FIGS. 3-6 taken perpendicular to the view in FIG. 6.
Figure 8:
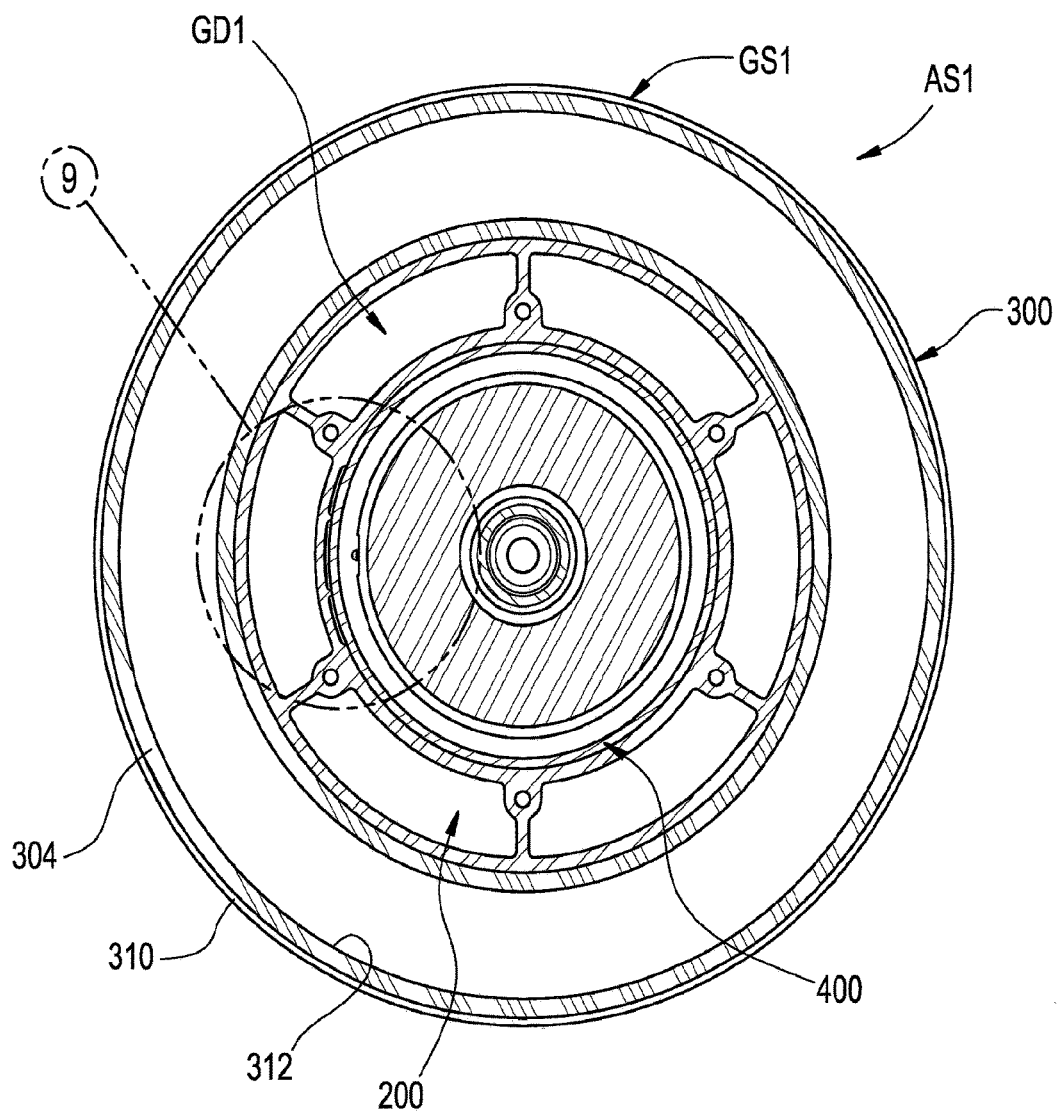
FIG. 8 is a cross-sectional plan view of the exemplary gas spring and gas damper assembly in FIGS. 3-7 taken from along line 8-8 in FIG. 5.
Figure 9:
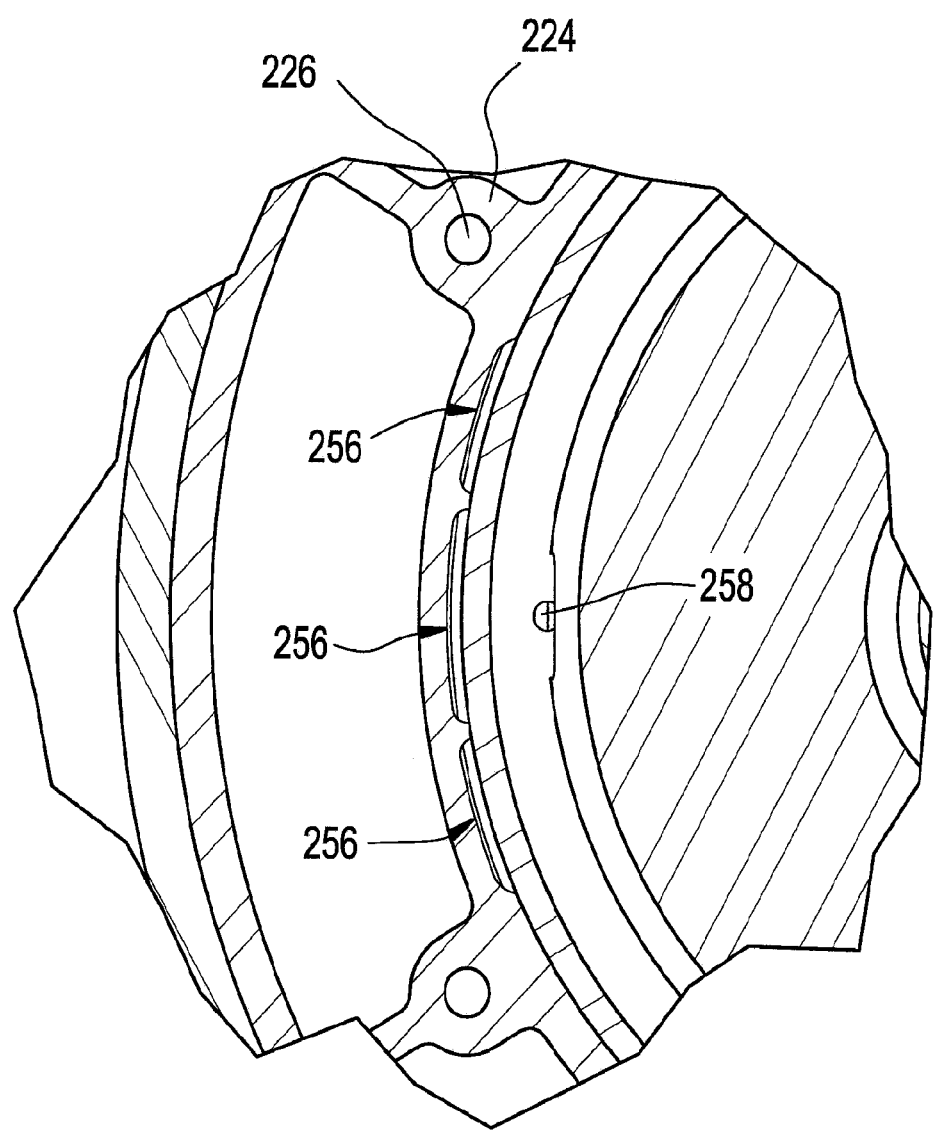
FIG. 9 is a greatly enlarged portion of the exemplary gas spring and gas damper in FIGS. 3-8 identified as Detail 9 in FIG. 8.
Figure 10:
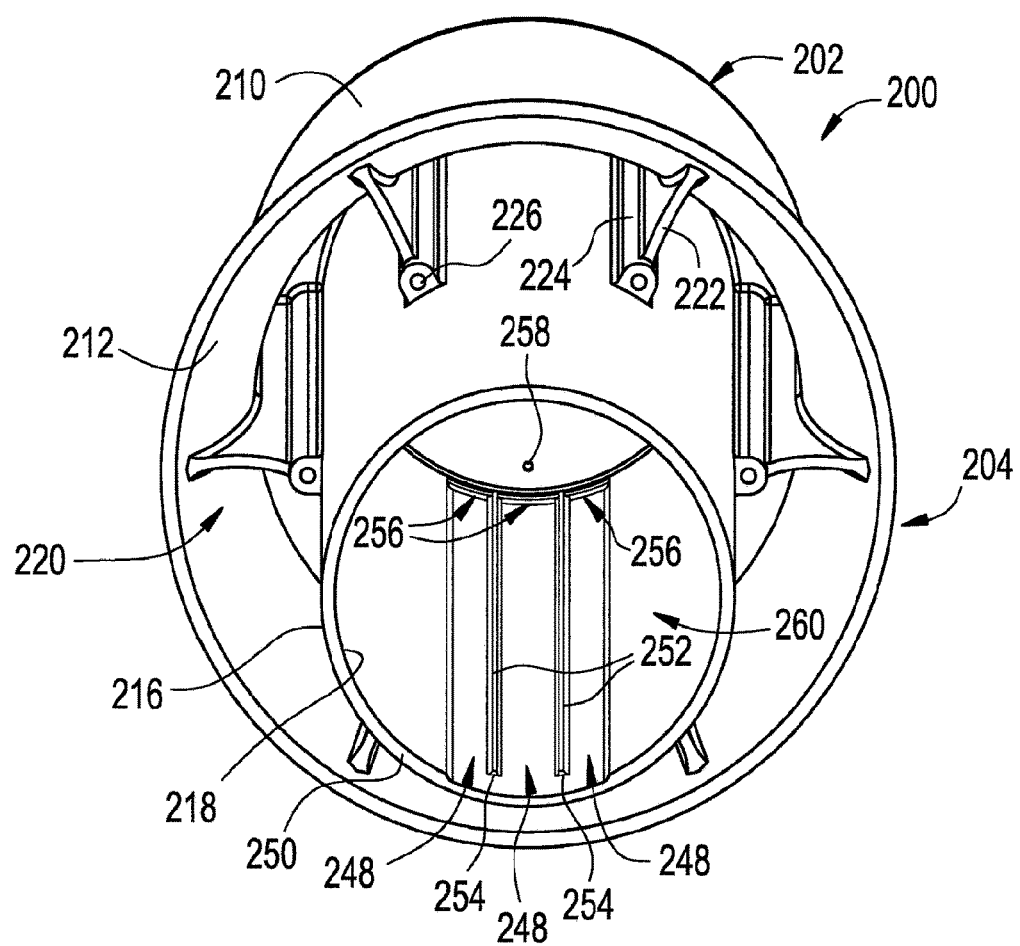
FIG. 10 is a bottom perspective view of the exemplary gas spring end member shown in FIGS. 3-9.
Figure 11:
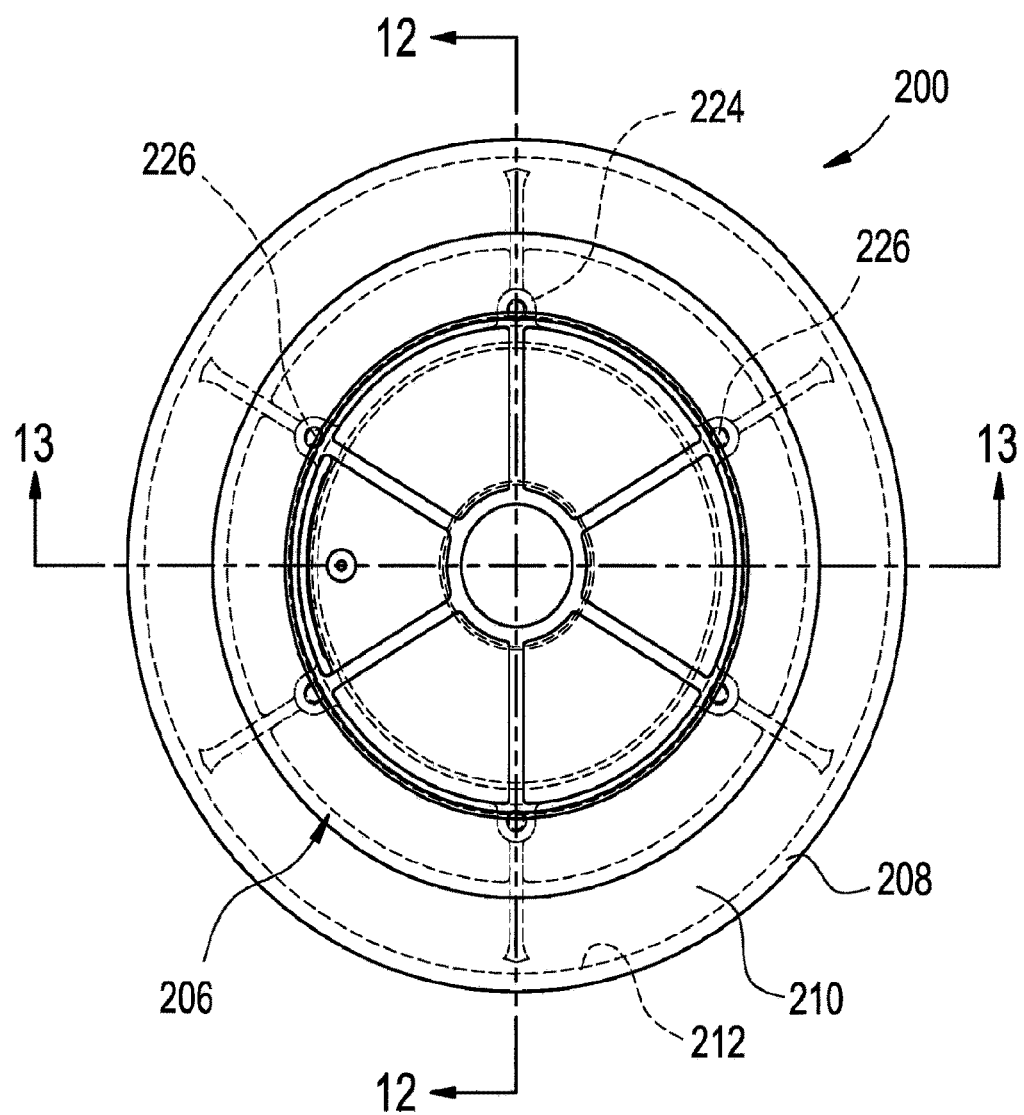
FIG. 11 is a top plan view of the exemplary gas spring end member in FIG. 10.
Figure 12:
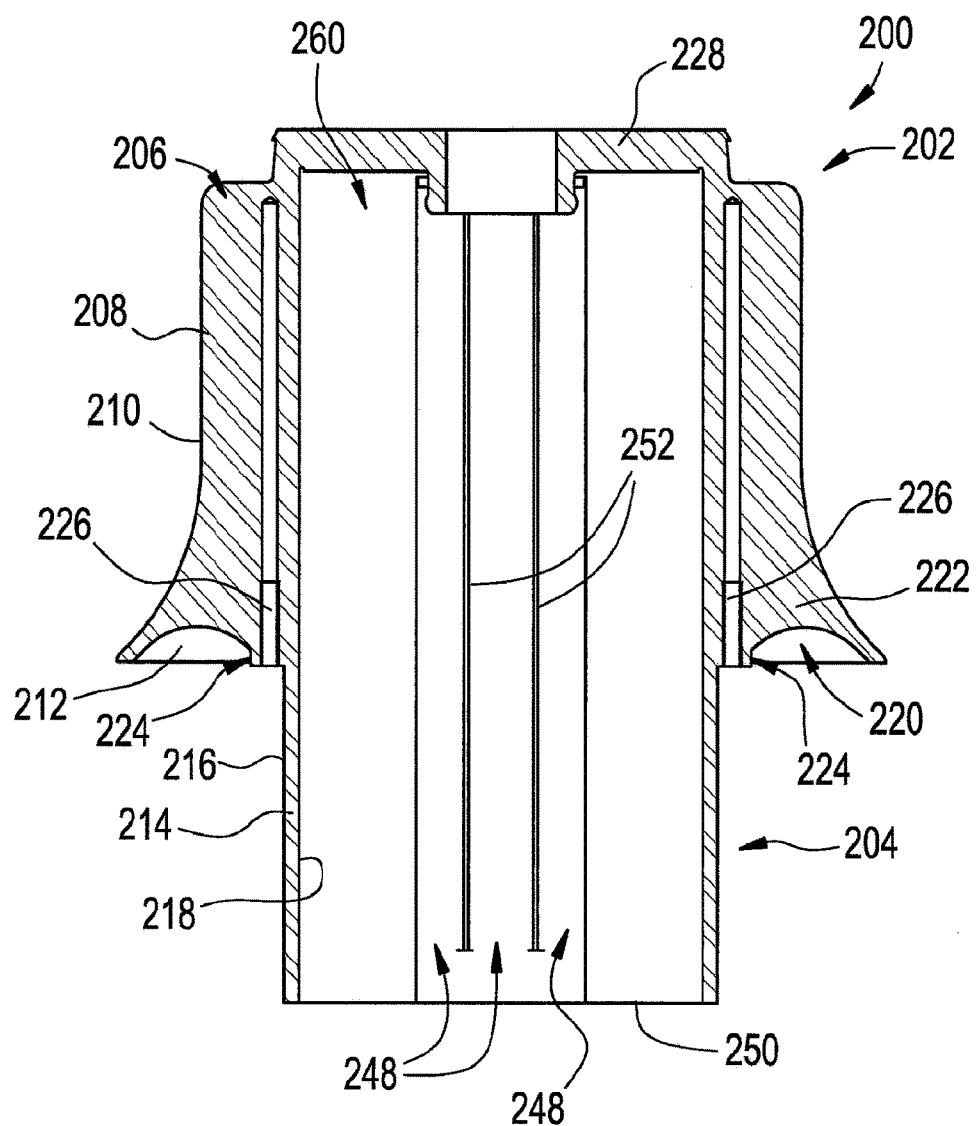
FIG. 12 is a cross-sectional side view of the exemplary gas spring end member in FIGS. 10 and 11 taken from along line 12-12 in FIG. 11.
Figure 13:
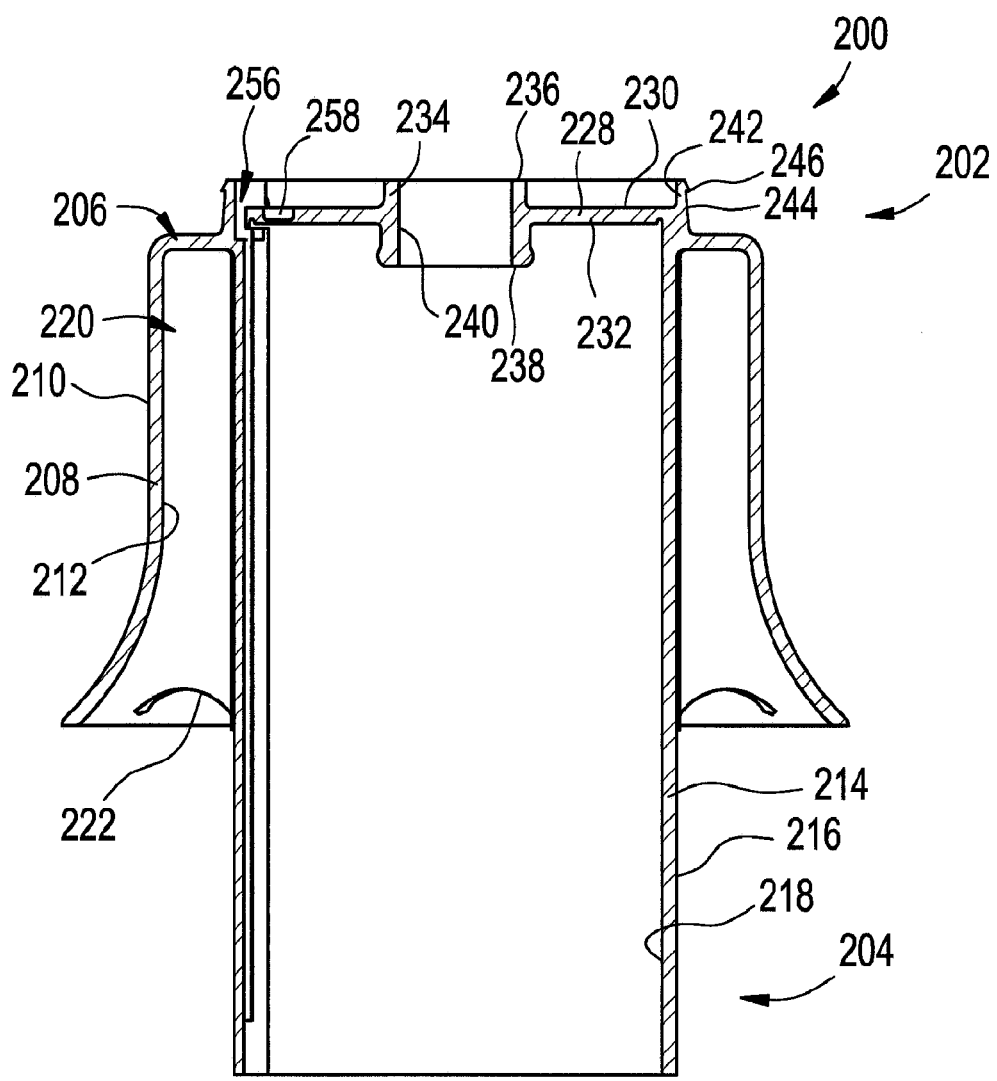
FIG. 13 is a cross-sectional side view of the exemplary gas spring end member in FIGS. 10-12 taken from along line 13-13 in FIG. 11.

Having described an example of a suspension system (e.g., suspension system 30) that can include gas spring and gas damper assemblies in accordance with the subject matter of the present disclosure, one example of such a gas spring and gas damper assembly will now be described in connection with FIGS. 3-9. As shown therein, one example of a gas spring and gas damper assembly AS1, such as may be suitable for use as one or more of gas spring and gas damper assemblies 74A and/or 74B in FIG. 2, for example, is shown as including a gas spring (or gas spring assembly) GS1 and a gas damper (or gas damper assembly) GD1. Gas spring assembly GS1 and gas damper assembly GD1 can be operatively secured to one another and fluidically coupled with one another in any suitable manner, such as is described hereinafter, for example. A longitudinal axis AX extends lengthwise along assembly AS1, as shown in FIGS. 6 and 7.

Gas spring assembly GS1 can include an end member 100 and an end member 200 that is spaced axially from end member 100. A flexible spring member 300 can extend peripherally around axis AX and can be secured between the end members in a substantially fluid-tight manner such that a spring chamber 302 is at least partially defined therebetween. Gas damper assembly GD1 can include an inner sleeve 400 that is operatively supported on or along end member 200 and a damper rod assembly 500 that is operatively associated with inner sleeve 400. An end mount 600 can operatively connect damper rod assembly 500 with end member 100. A base mount 700 can be operatively connected with one or more of end member 200 and/or inner sleeve 400.

Gas spring and gas damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 5, for example, end member 100 can be secured on or along a first or upper structural component USC, such as associated vehicle frame 36 or 52 in FIG. 1, for example, and can be secured thereto in any suitable manner. Additionally, base mount 700 can be secured on or along a second or lower structural component LSC, such as one of the axles associated with one or more of wheels 38, 54A and/or 54B in FIG. 1, for example.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 3-9 as including a flexible wall 304 that can be formed in any suitable manner and from any suitable material or combination of materials. For example the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 100 and/or end member 200. As one example, flexible spring member 300 can include a mounting bead 314 disposed along end 306 of flexible wall 304 and a mounting bead 316 disposed along end 308 of the flexible wall. In some cases, the mounting bead, if provided, can, optionally, include a reinforcing element, such as an endless, annular bead wire 318, for example.

It will be appreciated that the end members can be of any suitable type, kind, construction and/or configuration, and can be operatively connected or otherwise secured to the flexible spring member in any suitable manner. In the exemplary arrangement shown in FIGS. 3-9, for example, end member 100 is of a type commonly referred to as a bead plate and includes an end member wall 102 with an intermediate wall portion 104 and an outer peripheral wall portion 106. End member 100 is disposed along end 306 of flexible wall 304 with outer peripheral wall portion 106 crimped or otherwise deformed around at least a portion of mounting bead 314 such that a substantially fluid-tight seal can be formed between flexible spring member 300 and end member 100. Intermediate wall portion 104 can have an approximately planar outer surface 108 dimensioned to abuttingly engage an associated structural component (e.g., upper structural component USC).

End member 100 can also include a mounting wall portion 110 disposed radially inward from intermediate wall portion 104. Mounting wall portion 110 can project axially from along intermediate wall portion 104 toward a distal edge 112. Mounting wall portion 110 can at least partially define a passage or opening (not numbered) extending through end member 100. In some cases, one or more engagement features can be formed on or along mounting wall portion 110. It will be appreciated that any such one or more engagement features, if provided, can be of any suitable type, kind and/or configuration. For example, end member 100 is shown in FIGS. 6 and 7 as including an endless, annular groove 114 extending into mounting wall portion 110 adjacent distal edge 112. It will be appreciated, however, that other configurations and/or arrangements could alternately be used, such as an endless, annular ridge, or one or more ridge and/or groove segments, for example.

End member 200 is shown as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member 200, for example. As such, it will be appreciated that the wall portions of the end member can be of any suitable shape, profile and/or configuration, such as may be useful to provide one or more desired performance characteristics, for example, and that the profile shown in FIGS. 3-13 is merely exemplary.

End member 200 can extend lengthwise between opposing ends 202 and 204 that are axially spaced from one another. End member 200 can include an end member wall 206 that can have a first or outer side wall portion 208 that extends in a generally axial direction and includes an outside surface 210 and an inside surface 212. End member 200 can also include a second or inner side wall portion 214 that also extends in a generally axial direction. Inner side wall portion 214 is spaced radially inward from outer side wall portion 208 and includes an outside surface 216 and an inside surface 218.

In the arrangement shown in FIGS. 3-13, end member 200 includes a cavity 220 extending into the end member between inside surface 212 of outer side wall portion 208 and outside surface 216 of inner side wall portion 214. In some cases, one or more support wall portions 222 can extend between and operatively interconnect the outer and inner side wall portions. Additionally, in some cases, one or more bosses or projections can be provided on or along the end member wall, such as may be suitable for including one or more securement devices and/or securement features. In the exemplary arrangement shown in FIGS. 3-13, for example, end member wall 206 can include projections 224 that extend radially outward from along inner side wall portion 214 and axially along the inner side wall portion. Securement features 226, such as threaded passages, for example, can extend axially into projections 224. It will be appreciated, however, that other configurations and/or arrangements could alternately be used.

In some cases, an end wall portion 228 can extend across and/or between one or more of outer side wall portion 208 and inner side wall portion 214. If provided, end wall portion 228 can be oriented transverse to axis AX and can include opposing surfaces 230 and 232. Additionally, in some cases, end member wall 206 can include an inner support wall portion 234 that can be disposed radially inward from inner side wall portion 214. Inner support wall portion 234 can project axially from along end wall portion 228 and include one or more distal edges 236 and 238. Additionally, inner support wall portion 234 can include an inside surface 240 that can at least partially define a passage (not numbered) extending through end wall portion 228.

As indicated above, it will be appreciated that the one or more end members of the gas spring and gas damper assembly can be operatively connected or otherwise secured to the flexible spring member in any suitable manner. For example, end member wall 206 can include an inner mounting wall portion 242 that extends axially beyond end wall portion 228 and extends peripherally about axis AX. Inner mounting wall portion 242 can have an outer surface 244 that is dimensioned to receive mounting bead 316 disposed along end 308 of the flexible wall 304 such that a substantially fluid-tight seal can be formed therebetween. In some cases, a retaining ridge 246 can project radially outward from along the inner mounting wall portion 242 and can extend peripherally along at least a portion thereof, such as may assist in retaining end 308 of flexible wall 304 in abutting engagement on or along the end member.

In an assembled condition, outer surface 310 of flexible wall 304 can be disposed in abutting engagement with outside surface 210 of outer side wall portion 208. In such an arrangement, flexible wall 304 of flexible spring member 300 can form a rolling lobe 320 along the outside surface of outer side wall portion 208. As gas spring and gas damper assembly AS1 is displaced between compressed and extended conditions, rolling lobe 320 can be displaced along outer surface 210 in a generally conventional manner.

As mentioned above, a gas spring and gas damper assembly in accordance with the subject matter of the present disclosure can include one or more elongated gas damping passages through which pressurized gas can flow to generate pressurized gas damping to dissipate kinetic energy acting on the gas spring and gas damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

As indicated above, a gas spring and gas damper assembly in accordance with the subject matter of the present disclosure can include one or more elongated gas damping passages fluidically connected between the spring chamber and one or more damping chambers or damping chamber portions. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

As discussed above, a gas spring and gas damper assembly in accordance with the subject matter of the present disclosure can include one or more elongated gas damping passages in fluid communication between the spring chamber and one or more damping chambers or damping chamber portions. Differential pressure between the volumes can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

One or more elongated channels extend radially outward into inner side wall portion 214 from along inside surface 218. In the arrangement shown in FIGS. 3-13, for example, a plurality of elongated channels 248 extend axially along the inner side wall portion from along an edge 250 thereof toward end wall portion 228. It will be appreciated that intermediate wall portions 252 separate elongated channels 248 from one another. Additionally, it will be recognized that intermediate wall portions 252 extend from ends 254 toward end wall portion 228 with ends 254 spaced axially away from edge 250 of inner side wall portion 214. In this manner, pressurized gas flowing into or out of a given port or orifice can be distributed to each of the elongated channels. In some cases, intermediate wall portions 252 can extend into abutting engagement with end wall portion 228. In such case, a plurality of openings or passages 256 can be provided in fluid communication with elongated channels 248 that extend through end wall portion 228 or another feature of end member wall 206. It will be appreciated, however, that any suitable number of openings or passages could be used, and that any such one or more passages can take any suitable size, shape, configuration and/or arrangement. Additionally, in some cases, one or more passages 258 can extend through end wall portion 228 such as to permit fluid communication therethrough. One or more control devices, such as one or more valves 84 (FIG. 7), for example, can optionally be included on or along any such passages to selectively permit pressurized gas flow therethrough. Additionally, it will be appreciated that inside surface 218 of inner side wall portion 214 together with surface 232 of end wall portion 228 at least partially define an end member cavity 260 extending into end member 200 with an open end adjacent or otherwise along edge 250.

With reference, now, to gas damper assembly GD1, inner sleeve 400 thereof can include a sleeve wall 402 that extends axially between opposing ends 404 and 406. Sleeve wall 402 can extend peripherally about axis AX and can, in some cases, have an approximately uniform wall thickness. Additionally, in some cases, sleeve wall can have an approximately circular cross-sectional profile such that the inner sleeve is approximately cylindrical in overall shape. It will be appreciated, however, that other configurations and/or arrangements could alternately be used. Additionally, sleeve wall 402 forms an outer surface 408 along the inner sleeve. In a preferred arrangement, sleeve wall 402 is dimensioned to be received within end member cavity 260 of end member 200 with outer surface 408 disposed in facing relation to inside surface 218 of inner side wall portion 214. In such cases, a plurality of elongated gas damping passages can be formed by elongated channels 248 together with outer surface 408 of the inner sleeve. In some cases, one or more orifices or ports 410 can extend through sleeve wall 402. In a preferred arrangement, ports 410 can be disposed adjacent ends 254 of intermediate wall portions 252 such that pressurized gas flow through the ports can flow into and/or out of the elongated gas damping passages.

In an assembled condition, inner sleeve 400 is disposed within end member cavity 260 of end member 200 with an edge 412 disposed in abutting engagement with end wall portion 228 and an opposing edge 414 disposed adjacent edge 250 of inner side wall portion 214. Additionally, sleeve wall 402 forms an inner surface 416 within inner sleeve 400 that can at least partially define a damping chamber 418 within end member 200.

Damper rod assembly 500 includes an elongated damper rod 502 and a damper piston 504. Damper rod 502 extends longitudinally from an end 506 to an end 508. End 506 of damper rod 502 can include a securement feature dimensioned for operatively connecting the damper rod on or along end member 100. As one example, damper rod 502 can include one or more helical threads disposed along end 506. Damper piston 504 can be disposed along end 508 of damper rod 502 and can be attached or otherwise connected thereto in any suitable manner. For example, the damper piston could be integrally formed with the damper rod. As another example, end 508 of damper rod 502 could include a securement feature, such as one or more helical threads, for example. In such case, damper piston 504 could be provided separately and could include a passage or hole (not numbered) into which end 508 of damper rod 502 can be secured. In a preferred arrangement, a blind passage or hole can be used to assist in maintaining fluidic isolation across damper piston 504.

In an assembled condition, damper rod assembly 500 is disposed along gas spring assembly GS1 such that damper piston 504 is received within damping chamber 418 of inner sleeve 400. In such case, damper rod 502 can extend through the passage formed by inner support wall portion 234 of end member wall 206 and such that end 506 of damper rod 502 is disposed out of damping chamber 418. In some cases, a sealing element 510 (FIG. 14) and/or a wear bushing 512 (FIG. 14) can be disposed between inner support wall portion 234 and an outer surface 514 of damper rod 502.

Additionally, it will be appreciated that damper piston 504 separates damping chamber 418 into damping chamber portions 418A and 418B disposed along opposing sides of the damper piston. In some cases, a sealing element 516 can be disposed between an outer peripheral wall 518 of damper piston 504 and inner surface 416 of sleeve wall 402. It will be recognized, however, that in some cases significant frictional forces may be generated by the sealing arrangements described above in connection with the interface between damper piston 504 and inner surface 416 as well as in connection with the interface between outer surface 514 of damper rod 502 and inner support wall portion 234. In some cases, it may be desirable to avoid or at least reduce such frictional forces (or for other reasons) by forgoing the use of sealing elements along either or both interfaces. In such cases, one or more friction reducing bushings or wear bands can, optionally, be disposed therebetween.

Furthermore, in some cases, damper rod 502 can take the form of a hollow rod that includes an inner surface 520 that can at least partially define an elongated gas damping passage 522 extending through the damper rod. In such cases, one or more passages or ports 524 can extend through the wall of the damper rod to permit fluid communication between elongated gas damping passage 522 and damping chamber portion 418A of damping chamber 418.

End mount 600 is shown in FIGS. 3, 6, 7 and 14 as including an outer support element 602 that is dimensioned for receipt and securement within the opening formed in end member 100 by mounting wall portion 110. Outer support element 602 can include an element wall 604 with an outer peripheral surface 606 dimensioned to abuttingly engage an inner surface (not numbered) of mounting wall portion 110. In some cases, outer peripheral surface 606 of element wall 604 can include one or more engagement features, such as one or more endless annular grooves, endless annular projections and/or one or more portions of either or both thereof. In a preferred arrangement, outer support element is dimensioned for a press-fit connection with mounting wall portion 110 and engagement of the corresponding engagement features to retain the end mount on or along end member 100.

End mount 600 can also include an inner support element 608 dimensioned for securement on or along end 506 of damper rod 502. It will be appreciated that inner support element 608 can be of any suitable size, shape and/or configuration. As one example, inner support element 608 can include an element wall 610 with a connector portion 612 dimensioned for securement to the damper rod and a flange portion 612A projecting radially outward from connector portion 612. In some cases, a passage 614 can extend through element wall 610 and can be disposed in fluid communication with elongated gas damping passage 522 of damper rod 502, if provided, such that pressurized gas transfer into and out of the damping passage can be achieved.

End mount 600 can also include an elastomeric connector element 616 that is permanently attached (i.e., inseparable without damage, destruction or material alteration of at least one of the component parts) between outer and inner support elements 602 and 608. Additionally, in such a construction, elastomeric connector element 616 forms a substantially fluid-tight seal between outer and inner support elements 602 and 608. It will be appreciated that such substantially fluid-tight joints or connections can be formed by way of one or more processes and/or can include the use of one or more treatments and/or materials. Non-limiting examples of suitable processes can include molding, adhering, curing and/or vulcanizing.

In some cases, a sealing element 618 can be disposed between mounting wall portion 110 of end member 100 and outer support element 602. In this manner, a substantially fluid-tight construction can be formed between end member 100 and end mount 600. Additionally, in some cases, outer support element 602 can include one or more gas transfer passages 620 and/or one or more securement features 622. If provided, securement features 622 can be dimensioned to receive threaded fasteners 624, such as may be suitable for securing end member 100 and end mount 600 on or along an associated structural component (e.g., upper structural component USC in FIG. 5).

A base mount 700 can be configured to secure gas spring and gas damper assembly AS1 on or along an associate structural component, such as lower structural component LSC, for example. It will be appreciated any suitable combination of feature, elements and/or components can be used to form such a connection. As one example, base mount 700 can include a base mount wall 702 that includes a passage (not numbered) formed therethrough generally transverse to axis AX. Base mount wall 702 can function as an outer support element and an inner support element 704 can be disposed within the passage. An elastomeric connector element 706 can be permanently attached (i.e., inseparable without damage, destruction or material alteration of at least one of the component parts) between base mount wall 702 and inner support element 706 to form an elastomeric bushing 708 suitable for pivotally mounting assembly AS1 on or along the associated structural component.

Additionally, base mount wall 702 can include one or more passages 710 formed therethrough. Passages 710 can be disposed in approximate alignment with axis AX. Additionally, in a preferred arrangement, passages 710 can be disposed in approximate alignment with securement features 226 of projections 224 on end member 200. In such case, securement devices 712 (e.g., threaded fasteners) can extend through passages 710 and into engagement with securement features 226 to attach and secure base mount 700 on or along at least one of end member 200 and inner sleeve 400. In some cases, a sealing element 714 can be disposed between base mount wall 702 and one or more of end member 200 and inner sleeve 400 such that a substantially fluid-tight connection can be formed therebetween.

In some cases, one or more jounce bumpers can be included to inhibit contact between one or more features and/or components of assembly AS1. For example, a jounce bumper 716 can be disposed within damping chamber portion 418B, such as by securement on or along damper piston 504, for example, to substantially inhibit contact between the damper piston and base mount 700 during a full jounce condition of assembly AS1. Additionally, or in the alternative, a jounce bumper 718 can be disposed within damping chamber portion 418A, such as by securement on or along end wall portion 228, for example, to substantially inhibit contact between end wall portion 228 and damper piston 504 during a full rebound condition of assembly AS1.

Figure 14:
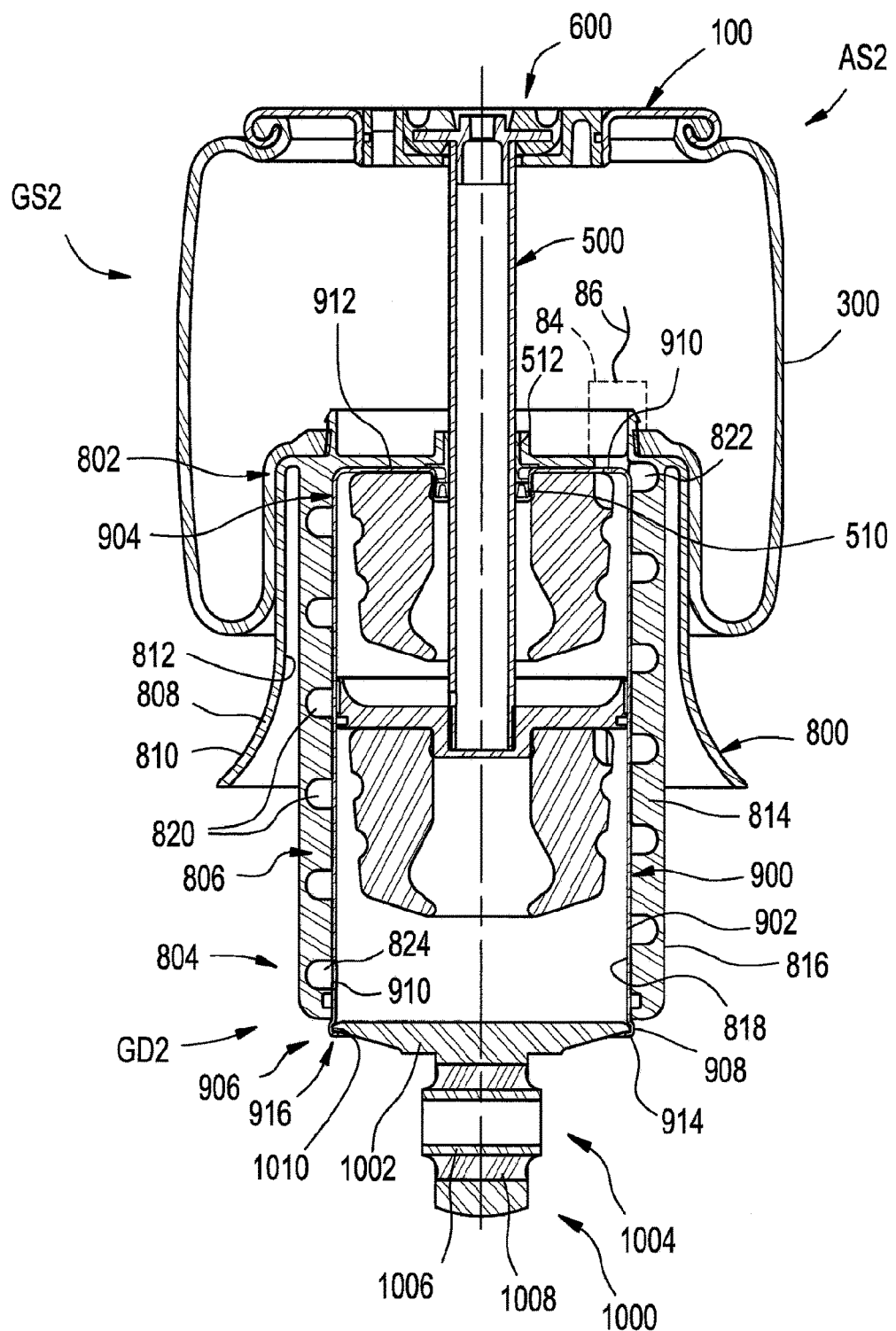
FIG. 14 is a cross-sectional side view of an alternate construction of an exemplary gas spring and gas damper assembly adapted for use in operative association with a suspension system in accordance with the subject matter of the present disclosure.

Another example of a gas spring and gas damper assembly AS2 that may be suitable for use as one or more of gas spring and gas damper assemblies 74A and/or 74B in FIG. 2, for example, is shown in FIG. 14 as including a gas spring (or gas spring assembly) GS2 and a gas damper (or gas damper assembly) GD2. Assembly AS2 includes a longitudinal axis AX, such as has been described above. Gas spring GS2 includes end member 100, such as has been described above, and an end member 800 that is spaced axially from end member 100. Flexible spring member 300, such as has been described above, can extend peripherally around axis AX and can be secured between end members 100 and 800 in a substantially fluid-tight manner such that spring chamber 302 is at least partially defined therebetween.

Gas damper GD2 can include an inner sleeve 900 that is operatively supported on or along end member 800 and damper rod assembly 500, such as has been described above, that is operatively associated with inner sleeve 900 in a manner substantially similar to that described above in detail. End mount 600, such as has been described above, can operatively connect damper rod assembly 500 with end member 100. A base mount 1000 can be operatively connected with one or more of end member 800 and inner sleeve 900. It is to be recognized and understood that the foregoing description of end member 100, flexible spring member 300, damper rod assembly 500 and end mount 600, including all of the features and functions thereof as well as any components that associated therewith, is equally applicable to gas spring assembly AS2 as if repeated in full detail here.

End member 800 can extend lengthwise between opposing ends 802 and 804 that are axially spaced from one another. End member 800 can include an end member wall 806 that can have a first or outer side wall portion 808 that extends in a generally axial direction and includes an outside surface 810 and an inside surface 812. End member 800 can also include a second or inner side wall portion 814 that also extends in a generally axial direction. Inner side wall portion 814 is spaced radially inward from outer side wall portion 808 and includes an outside surface 816 and an inside surface 818.

One or more elongated channels can extend into inner side wall portion 812 from along inside surface 818. One way in which end member 800 differs from end member 200 described above in detail is that the channels are shown as include one or more channels 820 that extend helically around axis AX rather than extending longitudinally along the inner side wall portion of the end member wall, as in end member 200. Helical channels 820 extend between opposing end ports 822 and 824.

Inner sleeve 900 can include a sleeve wall 902 that extends axially between opposing ends 904 and 906. Sleeve wall 902 can extend peripherally about axis AX and can, in some case, have an approximately uniform wall thickness. Additionally, sleeve wall 902 forms an outer surface 908 along the inner sleeve. In a preferred arrangement, sleeve wall 902 is dimensioned to be received within the end member cavity of end member 800 with outer surface 908 disposed in facing relation to inside surface 818 of inner side wall portion 814. In such case, a plurality of elongated gas damping passages can be formed by helical channels 820 together with outer surface 908 of the inner sleeve. In some cases, one or more orifices or ports 910 can extend through sleeve wall 902.

One way in which inner sleeve 900 differs from inner sleeve 400 described in detail above is that sleeve wall 902 include an end wall portion 912 that extends generally transverse to axis AX, and can receive and retain one or more components and/or elements, such as one or more sealing and/or bushing elements, for example. Additionally, sleeve wall 902 includes a distal end 914 that project outwardly beyond the distal edge of end member 800.

Base mount 1000 can include a base mount wall 1002 that can at least partially define an elastomeric bushing 1004 with an inner metal 1006 and an elastomeric connector element 1008. Base mount 1000 differs from base mount 700 in that base mount wall 1002 includes an outer peripheral edge 1010 dimensioned for receipt within distal end 914 of sleeve wall 902. A crimped connection 916 can be formed by distal end 914 of sleeve wall 902 around outer peripheral edge 1010 of base mount wall 1002 to secure the base mount on or along inner sleeve 900 and form a substantially fluid-tight seal therewith.

Figure 16A:
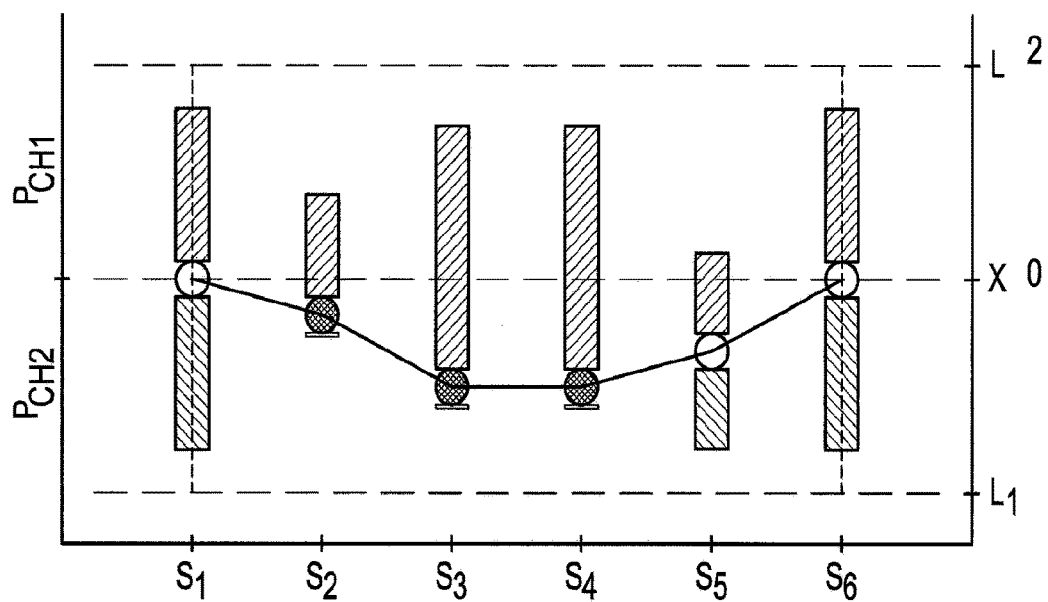
FIGS. 16A and 16B are graphical representations of exemplary characteristics having a relation to a suspension system undergoing the method of operation in FIG. 15.
Figure 16B:
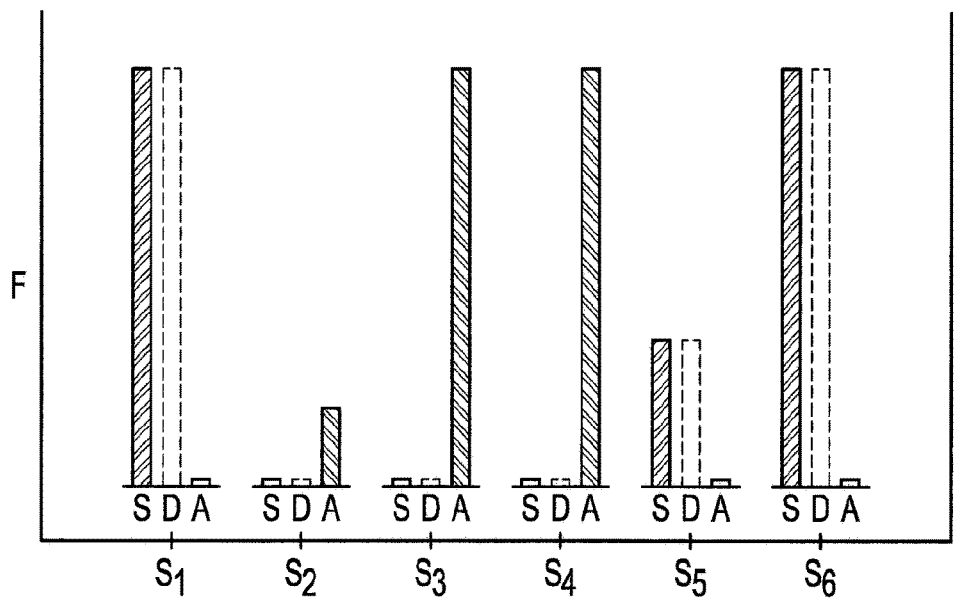

With reference to FIG. 15, one example of a method 1100 of operating a suspension system in accordance with the subject matter of the present disclosure is graphically represented in conjunction with FIGS. 16A and 16B. It will be appreciated that FIGS. 16A and 16B graphically represent certain properties and/or characteristics of gas spring and gas damper assemblies, such as one or more of assemblies 74A, 74B, AS1 and/or AS2, for example, at various intervals during the performance of method 1100 in FIG. 15.

Method 1100 includes providing a suspension system, as is represented in FIG. 15 by reference number 1102. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1102 can include providing a pressurized gas system (e.g., pressurized gas system 60), as is represented by reference number 1104. Additionally, providing a suspension system in 1102 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1106 and 1108 in FIG. 15. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1100 also includes receiving a signal initiating the performance of a transition of the assembly from a first condition (e.g., a spring and damper functionality) to a second condition (e.g., an actuator functionality), as is represented by item number 1110 and arrow 1112 in FIG. 15. Method 1100 can also include converting, actuating or otherwise transitioning the assembly from the first condition to the second condition, as is represented by item number 1114, and thereby retracting a secondary suspension system from deployment. In a preferred arrangement, method 1100 can maintain the secondary suspension system in a retracted position for an indeterminate duration, as is represented in FIG. 15 by item number 1116. In some cases, method 1100 can include receiving a signal to maintain the assembly and corresponding secondary suspension system in the second condition, as is represented by item number 1118 and arrow 1120.

Method 1100 also includes receiving a signal initiating the performance of a transition of the assembly from the second condition (e.g., actuator functionality) to the first condition (e.g., spring and damper functionality), as is represented by item number 1122 and arrow 1124 in FIG. 15. Method 1100 can further include converting, actuating or otherwise transitioning the assembly from the second condition to the first condition, as is represented by item number 1126, and thereby extending or otherwise re-deploying the secondary suspension system. Method 1100 can also include returning and, again, receiving a signal initiating the performance of a transition of the assembly from the first condition to the second condition at item number 1110, as is indicated by arrow 1128, such that the method can be repeated.

With reference, now, to FIGS. 15, 16A and 16B, a status S1 illustrates a condition of the suspension system prior to action 1114. At status S1, the assembly is at a design or nominal height (or length) X0 and the valve between chambers C1 and C2 is open, as is represented by the unfilled circle in FIG. 16A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 16B. In such conditions, actuation forces A are approximately zero. Furthermore, under such conditions, the assembly is capable of full displacement between displacement limits L1 and L2 in FIG. 16A, which can correspond to jounce and rebound limits of travel, respectively.

It will be appreciated that action 1114 of converting, actuating or otherwise transitioning the assembly from the first condition to the second condition and thereby retracting a secondary suspension system from deployment can be performed in any suitable manner. As one example, action 1114 can include restricting the transfer of pressurized gas between damping chambers C1 and C2, as is represented by item number 1130. Action 1114 can also include relieving gas pressure in chambers SP and/or C2, as is represented by item number 1132. Such a condition corresponds to status S2 in FIGS. 16A and 16B and thereby creating a pressure differential between pressures PCH1 and PCH2 as a result of the closed valve represented by the filled circle at status S2 in FIG. 16A. The differential pressure causes the assembly to decrease in length as is represented by the displacement from X0 in FIG. 16A and the generation of an initial actuation force A in FIG. 16B.

Action 1114 can also include increasing the pressure in chamber C1 and thereby increasing the pressure differential between PCH1 and PCH2 as well as further displacing the assembly from X0 as is represented by status S3 in FIG. 16A. Such an action causes a corresponding increase in actuation force A, as is represented in FIG. 16B. Action 1116 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1136 in FIG. 15 and status S4 in FIGS. 16A and 16B.

Action 1126 of converting, actuating or otherwise transitioning the assembly from the second condition to the first condition and thereby extending or otherwise re-deploying the secondary suspension system can be performed in any suitable manner. As one example, action 1126 can include opening a valve or otherwise permitting flow between chambers C1 and SP/C2, as is represented in FIG. 15 by item number 1138 and by the unfilled circle at status S5 in FIG. 16A. Under such a condition, pressures PCH1 and PCH2 are approximately equalized and the assembly is displaced toward design height X0. Additionally, actuation force A drops to approximately zero, and spring and damper forces, S and D, respectively, increase to an intermediate value, as illustrated in FIG. 16B. Action 1126 can also include increasing the pressure within at least one of chambers SP and C2, as is represented by item number 1140 in FIG. 15 and status S6 in FIGS. 16A and 16B. Under such conditions, pressures PCH1 and PCH2 increase but remain approximately equalized and the assembly is displaced toward the design height X0. Additionally, spring and potential damping forces, S and D, respectively, increase to full effectiveness.

Figure 18A:
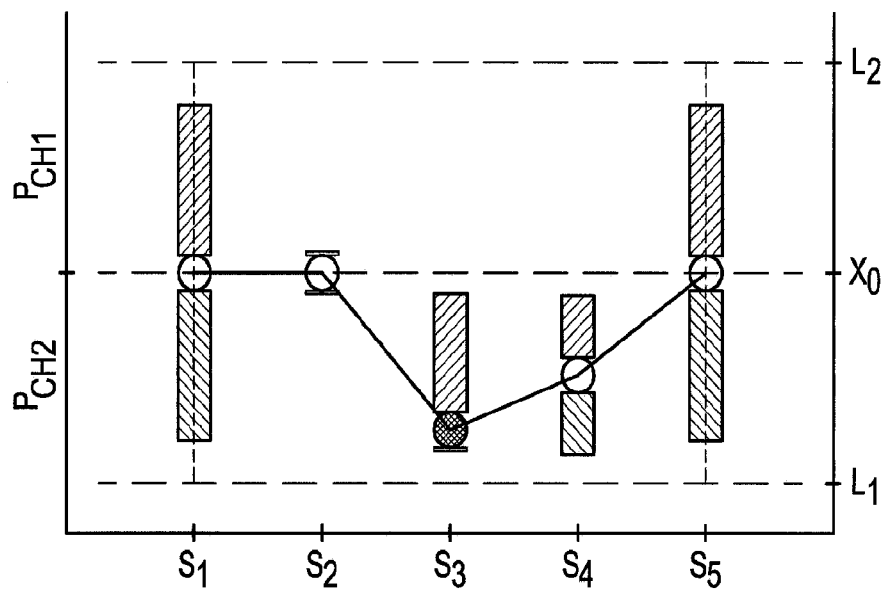
FIGS. 18A and 18B are graphical representations of exemplary characteristics having a relation to a suspension system undergoing the method of operation in FIG. 17.
Figure 18B:
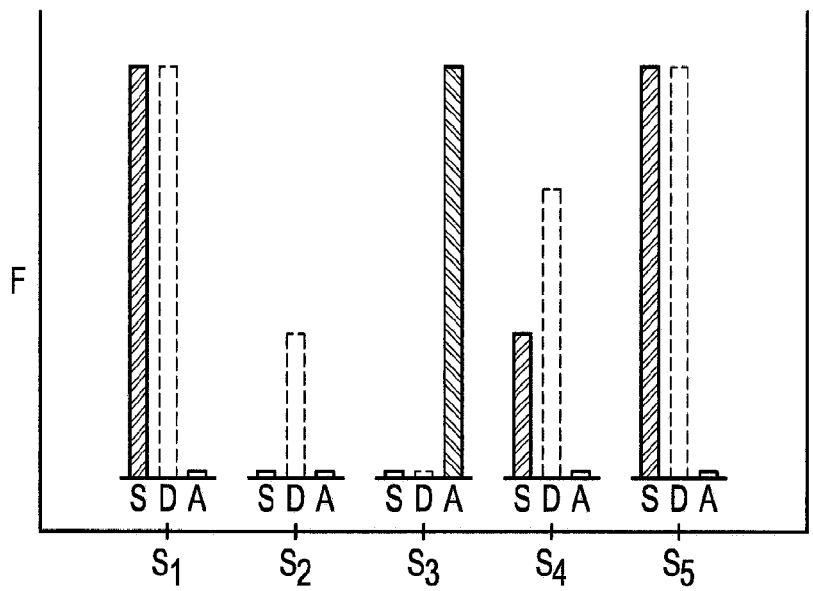

With reference to FIG. 17, another example of a method 1200 of operating a suspension system in accordance with the subject matter of the present disclosure is graphically represented in conjunction with FIGS. 18A and 18B. It will be appreciated that FIGS. 18A and 18B graphically represent certain properties and/or characteristics of gas spring and gas damper assemblies, such as one or more of assemblies 74A, 74B, AS1 and/or AS2, for example, at various intervals during the performance of method 1200 in FIG. 17.

Method 1200 includes providing a suspension system, as is represented in FIG. 17 by reference number 1202. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1202 can include providing a pressurized gas system (e.g., pressurized gas system 60), as is represented by reference number 1204. Additionally, providing a suspension system in 1202 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1206 and 1208 in FIG. 17. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1200 also includes receiving a signal initiating the performance of a transition of the assembly from a first condition (e.g., a spring and damper functionality) to a second condition (e.g., an actuator functionality), as is represented by item number 1210 and arrow 1212 in FIG. 17. Method 1200 can also include converting, actuating or otherwise transitioning the assembly from the first condition to the second condition, as is represented by item number 1214, and thereby retracting a secondary suspension system from deployment. In a preferred arrangement, method 1200 can maintain the secondary suspension system in a retracted position for an indeterminate duration, as is represented in FIG. 17 by item number 1216. In some cases, method 1200 can include receiving a signal to maintain the assembly and corresponding secondary suspension system in the second condition, as is represented by item number 1218 and arrow 1220.

Method 1200 also includes receiving a signal initiating the performance of a transition of the assembly from the second condition (e.g., actuator functionality) to the first condition (e.g., spring and damper functionality), as is represented by item number 1222 and arrow 1224 in FIG. 17. Method 1200 can further include converting, actuating or otherwise transitioning the assembly from the second condition to the first condition, as is represented by item number 1226, and thereby extending or otherwise re-deploying the secondary suspension system. Method 1200 can also include returning and, again, receiving a signal initiating the performance of a transition of the assembly from the first condition to the second condition at item number 1210, as is indicated by arrow 1228, such that the method can be repeated.

With reference, now, to FIGS. 17, 18A and 18B, a status S1 illustrates a condition of the suspension system prior to action 1214. At status S1, the assembly is at a design or nominal height (or length) X0 and the valve between chambers C1 and C2 is open, as is represented by the unfilled circle in FIG. 18A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 18B. In such conditions, actuation forces A are approximately zero. Furthermore, under such conditions, the assembly is capable of full displacement between displacement limits L1 and L2 in FIG. 18A, which can correspond to jounce and rebound limits of travel, respectively.

It will be appreciated that action 1214 of converting, actuating or otherwise transitioning the assembly from the first condition to the second condition and thereby retracting a secondary suspension system from deployment can be performed in any suitable manner. As one example, action 1214 can include releasing or otherwise relieving gas pressure within chambers SP, C1 and C2, as is represented by item number 1230 in FIG. 17 as well as status S2 in FIGS. 18A and 18B. Under such conditions, pressures PCH1 and PCH2 are substantially reduced (i.e., approximately zero) while the assembly remains at an approximately design height position X0. Additionally, spring and actuator forces, S and A, respectively, are approximately zero with some potential damping force D remaining.

Action 1214 can also include restricting the transfer of pressurized gas between damping chambers C1 and C2, as is represented by item number 1232. Action 1214 can further include increasing the pressure in chamber C1, as is represented by item number 1234 in FIG. 17 and the filled circle in status S3 in FIG. 18A. Such action can thereby increase the pressure differential between PCH1 and PCH2 and result in displacement the assembly from X0 as is represented by status S3 in FIG. 18A. Furthermore, such an action causes a corresponding increase in actuation force A, as is represented in FIG. 18B.

Action 1216 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1236 in FIG. 17 and status S3 in FIGS. 18A and 18B. Action 1226 of converting, actuating or otherwise transitioning the assembly from the second condition to the first condition and thereby extending or otherwise re-deploying the secondary suspension system can be performed in any suitable manner. As one example, action 1226 can include opening a valve or otherwise permitting flow between chambers C1 and SP/C2, as is represented in FIG. 17 by item number 1238 and by the unfilled circle at status S4 in FIG. 18A. Under such a condition, pressures PCH1 and PCH2 are approximately equalized and the assembly is displaced toward design height X0. Additionally, actuation force A drops to approximately zero, and spring and damper forces, S and D, respectively, increase to intermediate values, as illustrated in FIG. 18B. Action 1226 can also include increasing the pressure within at least one of chambers SP and C2, as is represented by item number 1240 in FIG. 17 and status S5 in FIGS. 18A and 18B. Under such conditions, pressures PCH1 and PCH2 increase but remain approximately equalized and the assembly is displaced toward the design height X0. Additionally, spring and potential damping forces, S and D, respectively, increase to full effectiveness.

Figure 20A:
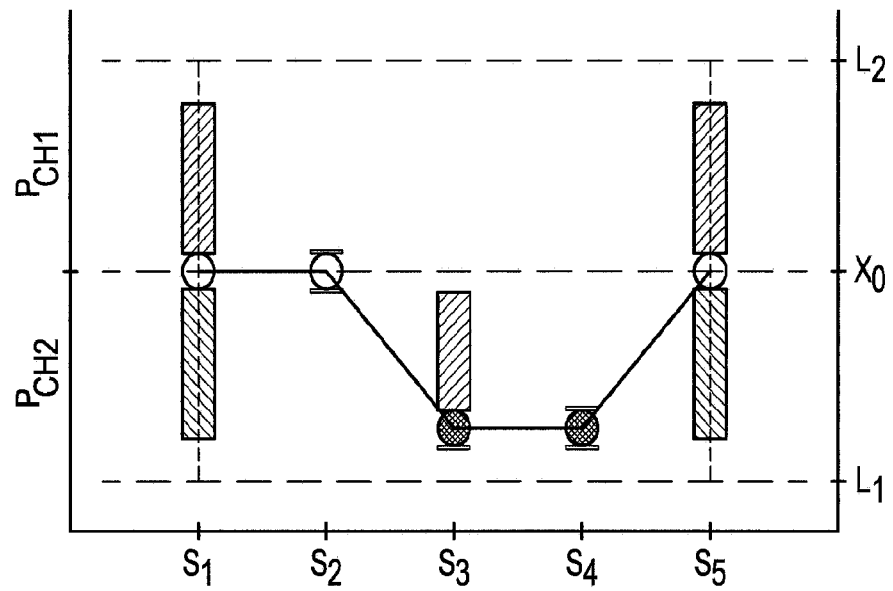
FIGS. 20A and 20B are graphical representations of exemplary characteristics having a relation to a suspension system undergoing the method of operation in FIG. 19.
Figure 20B:
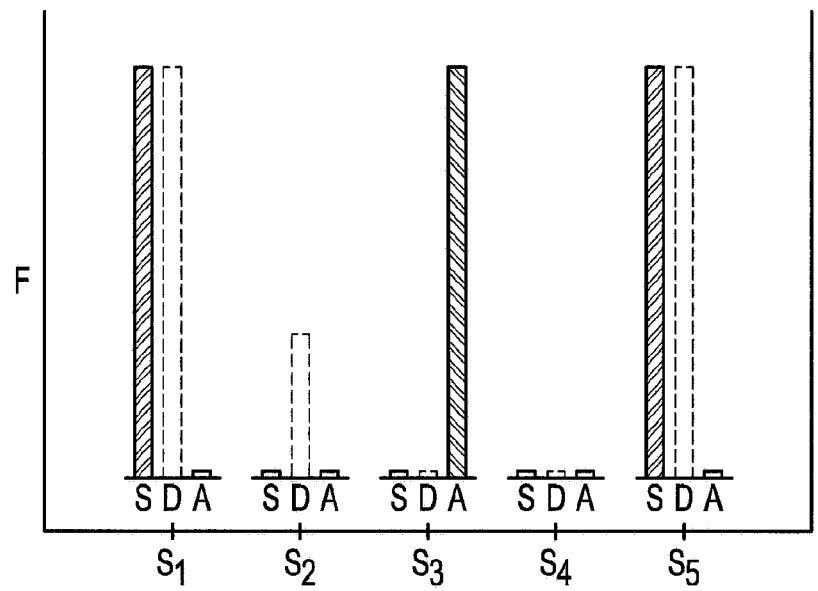

With reference to FIG. 19, still another example of a method 1300 of operating a suspension system in accordance with the subject matter of the present disclosure is graphically represented in conjunction with FIGS. 20A and 20B. It will be appreciated that FIGS. 20A and 20B graphically represent certain properties and/or characteristics of gas spring and gas damper assemblies, such as one or more of assemblies 74A, 74B, AS1 and/or AS2, for example, at various intervals during the performance of method 1300 in FIG. 19.

Method 1300 includes providing a suspension system, as is represented in FIG. 19 by reference number 1302. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1302 can include providing a pressurized gas system (e.g., pressurized gas system 60), as is represented by reference number 1304. Additionally, providing a suspension system in 1302 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1306 and 1308 in FIG. 19. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1300 also includes receiving a signal initiating the performance of a transition of the assembly from a first condition (e.g., a spring and damper functionality) to a second condition (e.g., an actuator functionality), as is represented by item number 1310 and arrow 1312 in FIG. 19. Method 1300 can also include converting, actuating or otherwise transitioning the assembly from the first condition to the second condition, as is represented by item number 1314, and thereby retracting a secondary suspension system from deployment. In a preferred arrangement, method 1300 can maintain the secondary suspension system in a retracted position for an indeterminate duration, as is represented in FIG. 19 by item number 1316. In some cases, method 1300 can include receiving a signal to maintain the assembly and corresponding secondary suspension system in the second condition, as is represented by item number 1318 and arrow 1320.

Method 1300 also includes receiving a signal initiating the performance of a transition of the assembly from the second condition (e.g., actuator functionality) to the first condition (e.g., spring and damper functionality), as is represented by item number 1322 and arrow 1324 in FIG. 19. Method 1300 can further include converting, actuating or otherwise transitioning the assembly from the second condition to the first condition, as is represented by item number 1326, and thereby extending or otherwise re-deploying the secondary suspension system. Method 1300 can also include returning and, again, receiving a signal initiating the performance of a transition of the assembly from the first condition to the second condition at item number 1310, as is indicated by arrow 1328, such that the method can be repeated.

With reference, now, to FIGS. 19, 20A and 20B, a status S1 illustrates a condition of the suspension system prior to action 1314. At status S1, the assembly is at a design or nominal height (or length) X0 and the valve between chambers C1 and C2 is open, as is represented by the unfilled circle in FIG. 20A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 20B. In such conditions, actuation forces A are approximately zero. Furthermore, under such conditions, the assembly is capable of full displacement between displacement limits L1 and L2 in FIG. 20A, which can correspond to jounce and rebound limits of travel, respectively.

It will be appreciated that action 1314 of converting, actuating or otherwise transitioning the assembly from the first condition to the second condition and thereby retracting a secondary suspension system from deployment can be performed in any suitable manner. As one example, action 1314 can include releasing or otherwise relieving gas pressure within chambers SP, C1 and C2, as is represented by item number 1330 in FIG. 19 as well as status S2 in FIGS. 20A and 20B. Under such conditions, pressures PCH1 and PCH2 are substantially reduced (i.e., approximately zero) while the assembly remains at an approximately design height position X0. Additionally, spring and actuator forces, S and A, respectively, are approximately zero with some potential damping force D remaining.

Action 1314 can also include restricting the transfer of pressurized gas between damping chambers C1 and C2, as is represented by item number 1332. Action 1314 can further include increasing the pressure in chamber C1, as is represented by item number 1334 in FIG. 19 and closed valve corresponding to the filled circle in status S3 in FIG. 20A. Such action can thereby increase the pressure differential between PCH1 and PCH2 and result in displacement the assembly from X0 as is represented by status S3 in FIG.

20A. Furthermore, such an action causes a corresponding increase in actuation force A, as is represented in FIG. 20B.

Action 1316 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1336 in FIG. 19 and status S3 in FIGS. 20A and 20B. Action 1326 of converting, actuating or otherwise transitioning the assembly from the second condition to the first condition and thereby extending or otherwise re-deploying the secondary suspension system can be performed in any suitable manner. As one example, action 1326 can include releasing or otherwise relieving gas pressure within chamber C1, as is represented by item number 1338 in FIG. 19 as well as status S4 in FIGS. 20A and 20B. Under such conditions, pressures PCH1 and PCH2 are at an approximate equilibrium at a substantially reduced pressure (i.e., approximately zero). And, because the valve remains closed, as is represented by the filled circle at status S4 in FIG. 20A, the position of the assembly remains in a displaced condition with respect to design height position X0. Additionally, spring, potential damper and actuator forces, S, D and A, respectively, are approximately zero.

Action 1326 can also include opening a valve or otherwise permitting flow between chambers C1 and SP/C2, as is represented in FIG. 19 by item number 1340 and by the unfilled circle at status S5 in FIG. 20A. Action 1326 can further include increasing the pressure within at least one of chambers SP and C2, as is represented by item number 1342 in FIG. 19. Under such a condition, pressures PCH1 and PCH2 are approximately equalized and the assembly is displaced toward design height X0. Additionally, actuation force A drops to approximately zero, and spring and damper forces, S and D, respectively, increase to substantially full values, as illustrated in FIG. 20B.

Figure 21:
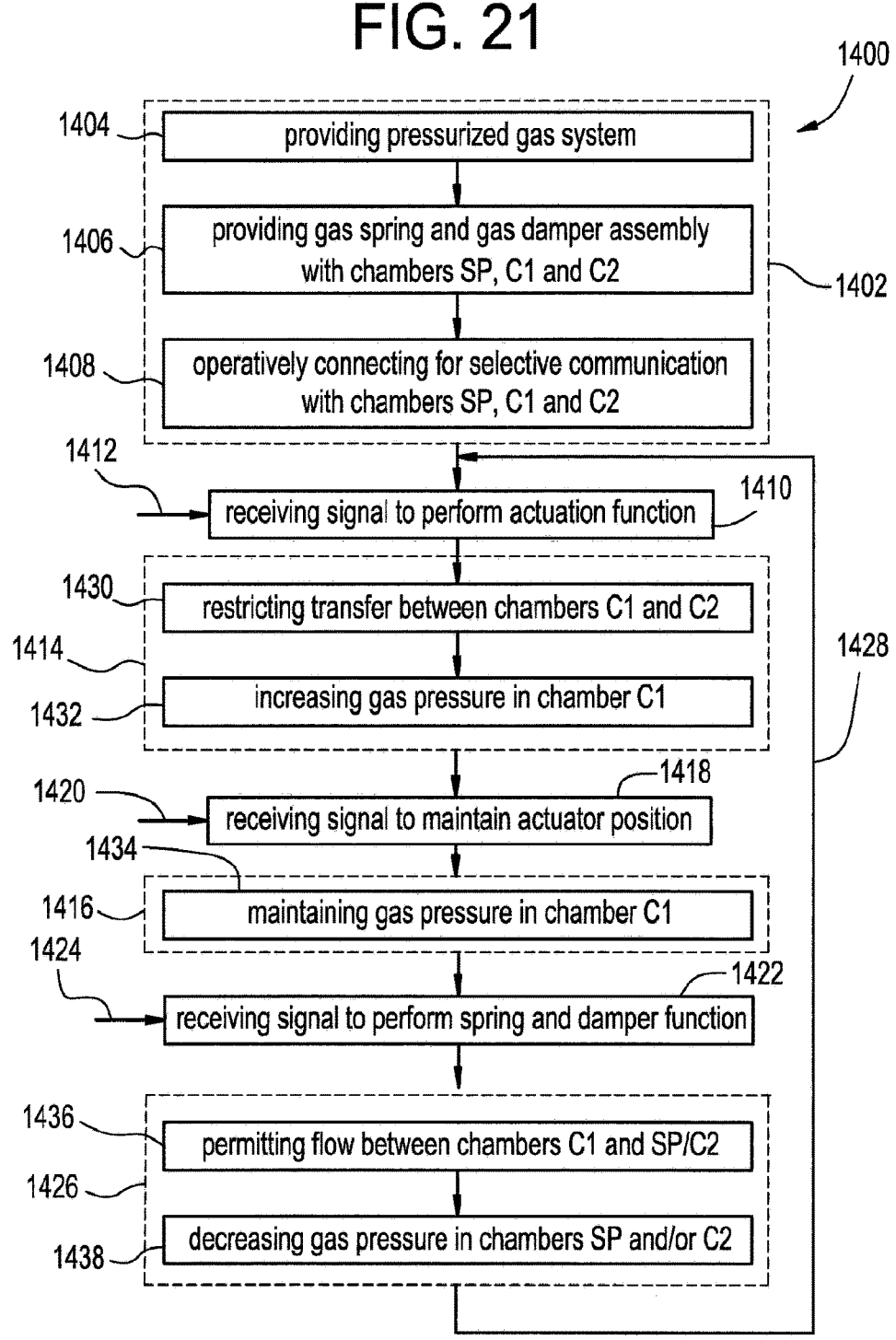
FIG. 21 is a graphical representation of a further example of a method of operating a suspension system in accordance with the subject matter of the present disclosure.
Figure 22A:
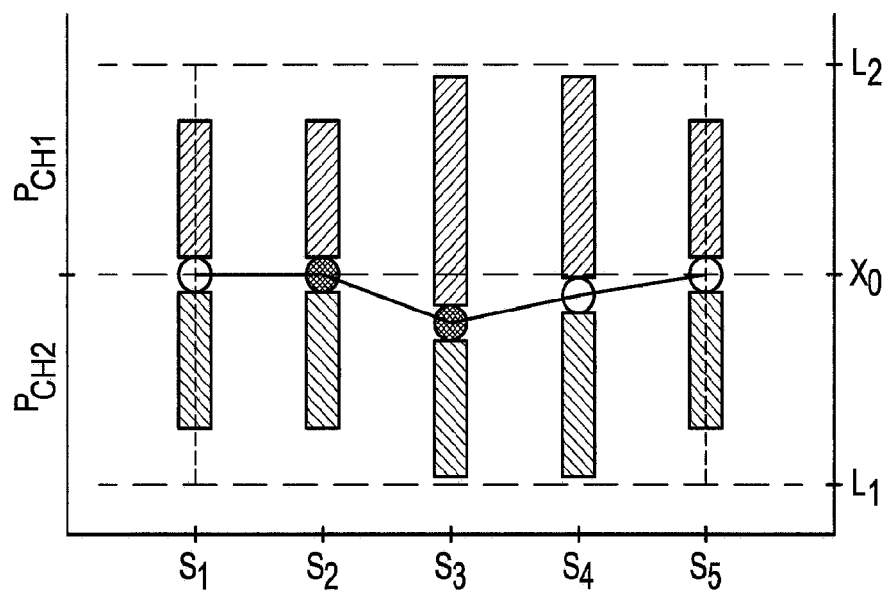
FIGS. 22A and 22B are graphical representations of exemplary characteristics having a relation to a suspension system undergoing the method of operation in FIG. 21.
Figure 22B:
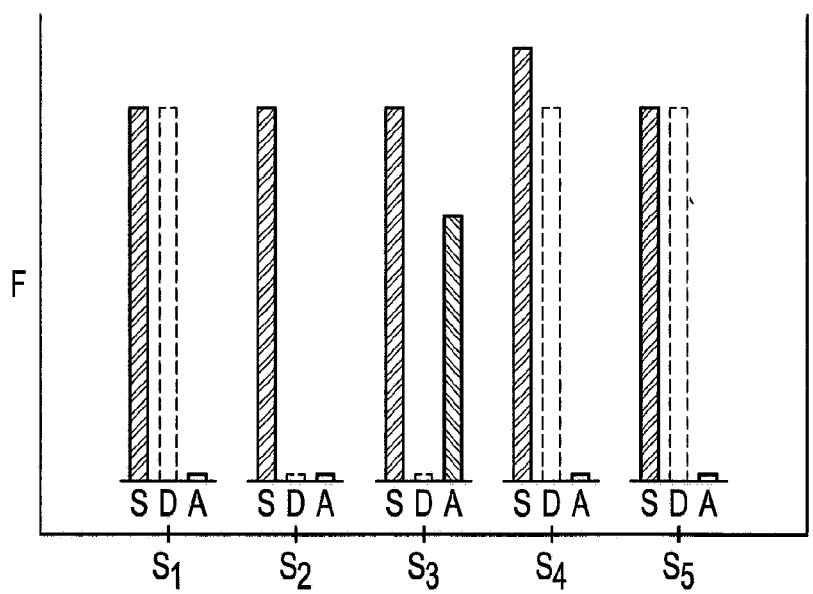

With reference to FIG. 21, a further example of a method 1400 of operating a suspension system in accordance with the subject matter of the present disclosure is graphically represented in conjunction with FIGS. 22A and 22B. It will be appreciated that FIGS. 22A and 22B graphically represent certain properties and/or characteristics of gas spring and gas damper assemblies, such as one or more of assemblies 74A, 74B, AS1 and/or AS2, for example, at various intervals during the performance of method 1400 in FIG. 21.

Method 1400 includes providing a suspension system, as is represented in FIG. 21 by reference number 1402. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1402 can include providing a pressurized gas system (e.g., pressurized gas system 60), as is represented by reference number 1404. Additionally, providing a suspension system in 1402 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1406 and 1408 in FIG. 21. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1400 also includes receiving a signal initiating the performance of a transition of the assembly from a first condition (e.g., a spring and damper functionality) to a second condition (e.g., an actuator functionality), as is represented by item number 1410 and arrow 1412 in FIG. 21. Method 1400 can also include converting, actuating or otherwise transitioning the assembly from the first condition to the second condition, as is represented by item number 1414, and thereby retracting a secondary suspension system from deployment. In a preferred arrangement, method 1400 can maintain the secondary suspension system in a retracted position for an indeterminate duration, as is represented in FIG. 21 by item number 1416. In some cases, method 1400 can include receiving a signal to maintain the assembly and corresponding secondary suspension system in the second condition, as is represented by item number 1418 and arrow 1420.

Method 1400 also includes receiving a signal initiating the performance of a transition of the assembly from the second condition (e.g., actuator functionality) to the first condition (e.g., spring and damper functionality), as is represented by item number 1422 and arrow 1424 in FIG. 21. Method 1400 can further include converting, actuating or otherwise transitioning the assembly from the second condition to the first condition, as is represented by item number 1426, and thereby extending or otherwise re-deploying the secondary suspension system. Method 1400 can also include returning and, again, receiving a signal initiating the performance of a transition of the assembly from the first condition to the second condition at item number 1410, as is indicated by arrow 1428, such that the method can be repeated.

With reference, now, to FIGS. 21, 22A and 22B, a status S1 illustrates a condition of the suspension system prior to action 1414. At status S1, the assembly is at a design or nominal height (or length) X0 and the valve between chambers C1 and C2 is open, as is represented by the unfilled circle in FIG. 22A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 22B. In such conditions, actuation forces A are approximately zero. Furthermore, under such conditions, the assembly is capable of full displacement between displacement limits L1 and L2 in FIG. 22A, which can correspond to jounce and rebound limits of travel, respectively.

It will be appreciated that action 1414 of converting, actuating or otherwise transitioning the assembly from the first condition to the second condition and thereby retracting a secondary suspension system from deployment can be performed in any suitable manner. As one example, action 1414 can include restricting the transfer of pressurized gas between damping chambers C1 and C2, as is represented by item number 1430 and status S2 of FIGS. 22A and 22B. Under such conditions, spring force S remains at full value, but potential damping force D decreases to approximately zero due to the closed valve, which is represented in FIG. 22A by the filled circle at status S2.

Action 1414 can also include increasing the pressure in chamber C1 and thereby increasing the pressure differential between PCH1 and PCH2 as well as displacing the assembly from X0 as is represented by item number 1432 and by status S3 in FIG. 22A. Such an action causes an increase in actuation force A while spring force S remains at full value, as is represented in FIG. 22B. The increased differential pressure causes the assembly to decrease in length as is represented by the displacement from X0 in FIG. 22A and the generation of an initial actuation force A in FIG. 22B.

Action 1416 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1434 in FIG. 21 and status S3 in FIGS. 22A and 22B.

Action 1426 of converting, actuating or otherwise transitioning the assembly from the second condition to the first condition and thereby extending or otherwise re-deploying the secondary suspension system can be performed in any suitable manner. As one example, action 1426 can include opening a valve or otherwise permitting flow between chambers C1 and SP/C2, as is represented in FIG. 21 by item number 1436 and by the unfilled circle at status S4 in FIG. 22A. Under such a condition, pressures PCH1 and PCH2 are approximately equalized and the assembly is displaced toward design height X0. Additionally, actuation force A drops to approximately zero, and spring and damper forces, S and D, respectively, increase to greater values, as illustrated in FIG. 22B. Action 1426 can also include decreasing the pressure within at least one of chambers SP and C2, as is represented by item number 1438 in FIG. 21 and status S5 in FIGS. 22A and 22B. Under such conditions, pressures PCH1 and PCH2 decrease but remain approximately equalized and the assembly is displaced toward the design height X0. Additionally, spring and potential damping forces, S and D, respectively, reach full effectiveness.

Figure 24A:
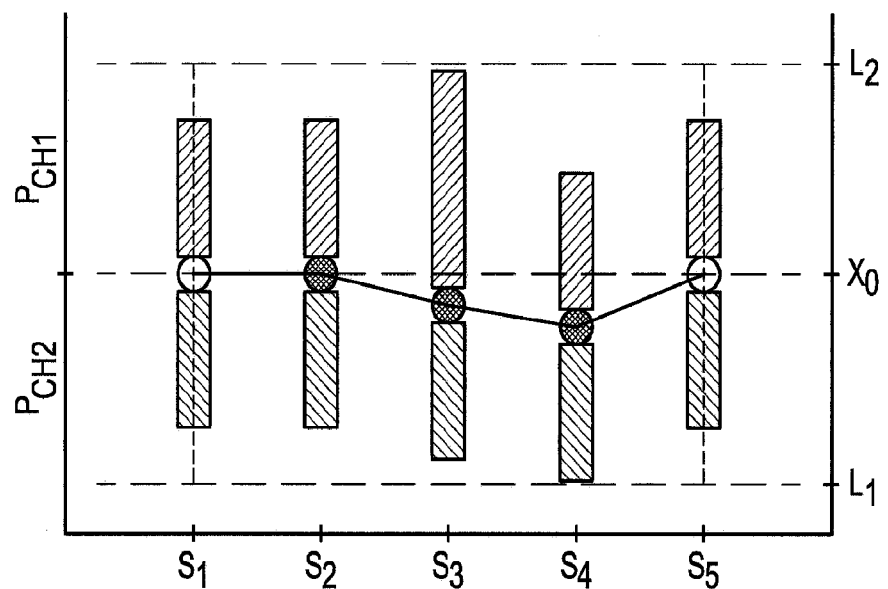
FIGS. 24A and 24B are graphical representations of exemplary characteristics having a relation to a suspension system undergoing the method of operation in FIG. 23.
Figure 24B:
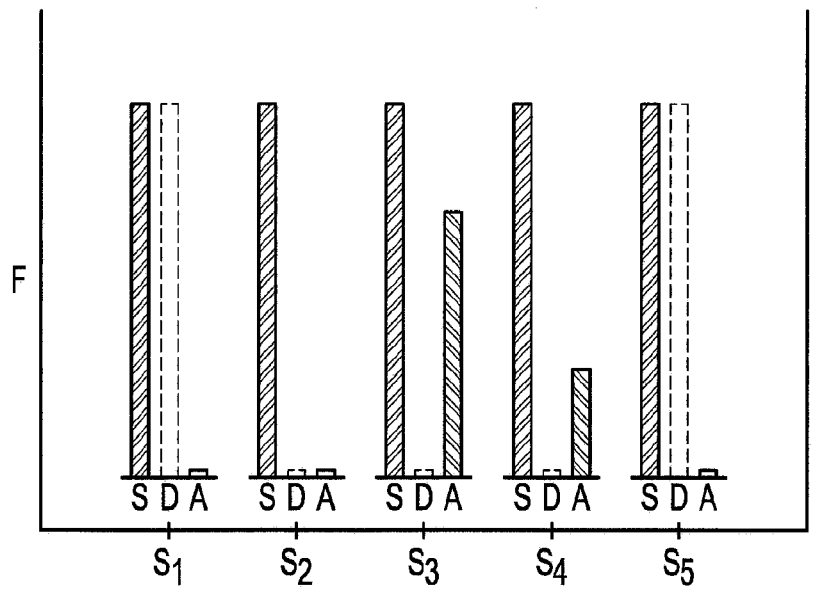

With reference to FIG. 23, still a further example of a method 1500 of operating a suspension system in accordance with the subject matter of the present disclosure is graphically represented in conjunction with FIGS. 24A and 24B. It will be appreciated that FIGS. 24A and 24B graphically represent certain properties and/or characteristics of gas spring and gas damper assemblies, such as one or more of assemblies 74A, 74B, AS1 and/or AS2, for example, at various intervals during the performance of method 1500 in FIG. 23.

Method 1500 includes providing a suspension system, as is represented in FIG. 23 by reference number 1502. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1502 can include providing a pressurized gas system (e.g., pressurized gas system 60), as is represented by reference number 1504. Additionally, providing a suspension system in 1502 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1506 and 1508 in FIG. 23. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1500 also includes receiving a signal initiating the performance of a transition of the assembly from a first condition (e.g., a spring and damper functionality) to a second condition (e.g., an actuator functionality), as is represented by item number 1510 and arrow 1512 in FIG. 23. Method 1500 can also include converting, actuating or otherwise transitioning the assembly from the first condition to the second condition, as is represented by item number 1514, and thereby retracting a secondary suspension system from deployment. In a preferred arrangement, method 1500 can maintain the secondary suspension system in a retracted position for an indeterminate duration, as is represented in FIG. 23 by item number 1516. In some cases, method 1500 can include receiving a signal to maintain the assembly and corresponding secondary suspension system in the second condition, as is represented by item number 1518 and arrow 1520.

Method 1500 also includes receiving a signal initiating the performance of a transition of the assembly from the second condition (e.g., actuator functionality) to the first condition (e.g., spring and damper functionality), as is represented by item number 1522 and arrow 1524 in FIG. 23. Method 1500 can further include converting, actuating or otherwise transitioning the assembly from the second condition to the first condition, as is represented by item number 1526, and thereby extending or otherwise re-deploying the secondary suspension system. Method 1500 can also include returning and, again, receiving a signal initiating the performance of a transition of the assembly from the first condition to the second condition at item number 1510, as is indicated by arrow 1528, such that the method can be repeated.

With reference, now, to FIGS. 23, 24A and 24B, a status S1 illustrates a condition of the suspension system prior to action 1514. At status S1, the assembly is at a design or nominal height (or length) X0 and the valve between chambers C1 and C2 is open, as is represented by the unfilled circle in FIG. 24A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 24B. In such conditions, actuation forces A are approximately zero. Furthermore, under such conditions, the assembly is capable of full displacement between displacement limits L1 and L2 in FIG. 24A, which can correspond to jounce and rebound limits of travel, respectively.

It will be appreciated that action 1514 of converting, actuating or otherwise transitioning the assembly from the first condition to the second condition and thereby retracting a secondary suspension system from deployment can be performed in any suitable manner. As one example, action 1514 can include restricting the transfer of pressurized gas between damping chambers C1 and C2, as is represented by item number 1530 and status S2 of FIGS. 24A and 24B. Under such conditions, spring force S remains at full value, but potential damping force D decreases to approximately zero due to the closed valve, which is represented in FIG. 24A by the filled circle at status S2.

Action 1514 can also include increasing the pressure in chamber C1 and thereby increasing the pressure differential between PCH1 and PCH2 as well as displacing the assembly from X0 as is represented by item number 1532 and by status S3 in FIG. 24A. Such an action causes the generation of an actuation force A while spring force S remains at full value, as is represented in FIG. 24B. The increased differential pressure causes the assembly to decrease in length as is represented by the displacement from X0 in FIG. 24A.

Action 1516 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1534 in FIG. 23 and status S3 in FIGS. 24A and 24B.

Action 1526 of converting, actuating or otherwise transitioning the assembly from the second condition to the first condition and thereby extending or otherwise re-deploying the secondary suspension system can be performed in any suitable manner. As one example, action 1526 can include decreasing the pressure within chamber C1, as is represented by item number 1536 in FIG. 23 and status S4 in FIGS. 24A and 24B. Under such conditions, pressures PCH1 and PCH2 may become approximately equalized resulting in a reduction in actuation force A as well as the displacement of the assembly toward a further retracted condition, such as is represented by status S4 in FIGS. 24A and 24B.

Action 1526 can also include opening a valve or otherwise permitting flow between chambers C1 and SP/C2, as is represented in FIG. 23 by item number 1538 and by the unfilled circle at status S5 in FIG. 24A. Under such a condition, pressures PCH1 and PCH2 are approximately equalized and the assembly is displaced toward design height X0. Additionally, actuation force A drops to approximately zero, and spring and damper forces, S and D, respectively, increase to approximately full values, as illustrated in FIG. 24B.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A suspension system comprising:
a gas spring and gas damper assembly securable to an associated secondary suspension portion, said assembly adapted to operate in a first condition in which said assembly provides spring and damping functionality to the associated secondary suspension portion across a first range of travel when the associated secondary suspension portion is in a deployed position and a second condition in which said assembly provides actuator functionality to the associated secondary suspension portion with a second range of travel that is substantially less than said first range of travel, said actuator functionality operative to retract the associated secondary suspension portion into a storage position and retain the associated secondary suspension portion in the storage position for an indeterminate period of time;
a pressurized gas system in fluid communication with said assembly; and,
a control system in communication with at least one of said assembly and said pressurized gas system, said control system operative to:
receive a signal initiating a transition of said assembly from said first condition to said second condition;
actuate one or more control devices operatively associated with at least one of said assembly and said pressurized gas system to transfer pressurized gas within said assembly to transition said assembly from said first condition to said second condition and thereby retract the associated secondary suspension portion into the storage position and retain the associated secondary suspension portion in the storage position;

maintain said assembly in said second condition for an indeterminate period of time;

receive a signal initiating a transition of said assembly from said second condition to said first condition; and, actuate one or more control devices operatively associated with at least one of said assembly and said pressurized gas system to transfer pressurized gas within said assembly to transition said assembly from said second condition to said first condition and thereby extend the associated secondary suspension portion into the deployed position.

2. A suspension system according to claim 1, wherein said gas spring and gas damper assembly includes a gas spring and a gas damper;

said gas spring including:
a flexible spring member having a longitudinal axis and including a flexible wall extending longitudinally between first and second ends and peripherally about said axis to at least partially define a spring chamber;
a first end member secured across said first end of said flexible spring member such that a substantially fluid-tight seal is formed therebetween; and,
a second end member disposed in spaced relation to said first end member and secured across said second end of said flexible spring member such that a substantially fluid-tight seal is formed therebetween, said second end member including an end member wall having an outside surface dimensioned for abutting engagement with said flexible wall of said flexible spring member and an inside surface at least partially defining an end member cavity; and, said gas damper including:
an inner sleeve extending longitudinally between opposing sleeve ends, said inner sleeve including a sleeve wall with an inner surface and an outer surface, said inner sleeve at least partially received within said end member cavity such that said outer surface of said sleeve wall is disposed in facing relation to said inside surface of said end member wall, said inner surface of said sleeve wall at least partially defining a damping chamber; and,
a damper piston assembly including a damper piston and an elongated damper rod operatively connected to said damper piston, said damper piston positioned within said damping chamber and including an outer side wall disposed adjacent said inner surface of said inner sleeve, said damper piston separating said piston chamber into first and second chamber portions with at least one of said first and second chamber portions disposed in fluid communication with said spring chamber through one or more elongated damping passages that are capable of providing pressurized gas damping;
said damper rod operatively connected to said first end member such that upon extension and compression of said gas spring and gas damper assembly, said damper piston is reciprocally displaced within said damping chamber.

3. A suspension system according to claim 2, wherein said one or more elongated damping passages extend helically around said first and second chamber portions.

4. A suspension system according to claim 2, wherein said inner surface of said end member wall includes a plurality of axially extending channels, and said one or more elongated damping passages are defined between said outer surface of said sleeve wall and said inner surface of said end member wall.

5. A suspension system according to claim 1, wherein said control system includes an actuation module operative to actuate said one or more control devices operatively associated with at least one of said assembly and said pressurized gas system to transfer pressurized gas within said assembly and thereby transition said assembly from said first condition to said second condition.

6. A suspension system according to claim 5, wherein said actuation module is operative to maintain said assembly in said second condition for an indeterminate period of time.

7. A suspension system according to claim 1, wherein said control system includes a return module operative to actuate said one or more control devices operatively associated with at least one of said assembly and said pressurized gas system to transfer pressurized gas within said assembly and thereby transition said assembly from said second condition to said first condition.

8. A suspension system according to claim 1, wherein said control system includes an operating module operative to determine at least one of a first situation appropriate for transitioning said assembly from said first condition to said second condition and a second situation appropriate for transitioning said assembly from said second condition to said first condition.

9. A suspension system according to claim 8, wherein said operating module is operative to communicate a signal corresponding to at least one of said first situation and said second situation.

10. A suspension system according to claim 1, wherein said control system includes a user-actuation device selectively operative by an associated user for generating at least one of said signal initiating a transition of said assembly from said first condition to said second condition and said signal initiating a transition of said assembly from said second condition to said first condition.

11. A suspension system according to claim 1, wherein said control system includes a return module operative to maintain said assembly in said first condition for an indeterminate period of time.

12. A suspension system according to claim 1, wherein said control system includes at least one of a push button and a selector switch for initiating at least one of actuation and de-actuation of said suspension system.

13. A suspension system according to claim 1, wherein said control system includes at least one of a push button and selector switch for transitioning said gas spring and gas damper assembly to, from and/or between said actuator functionality and said spring and damping functionality.

14. A method of operating a suspension system having a secondary suspension portion, said method comprising:
providing a suspension system including:
a gas spring and gas damper assembly securable the secondary suspension portion, said assembly adapted operate in a first condition in which said assembly provides spring and damping functionality across a first range of travel when the secondary suspension portion is in a deployed condition and a second condition in which said assembly provides actuator functionality with a second range of travel that is substantially less than said first range of travel, said actuator functionality operative to retract the secondary suspension portion into a storage condition and retain the secondary suspension portion in the storage condition for an indeterminate period of time; and, a pressurized gas system in fluid communication with said assembly;

initiating a transition of said assembly from said first condition to said second condition to thereby retract the secondary suspension portion into the storage position and retain the secondary suspension portion in the storage position;

maintaining said assembly in said second condition for an indeterminate period of time; and, initiating a transition of said assembly from said second condition to said first condition to thereby extend the secondary suspension portion into the deployed position.

15. A method according to claim 14, wherein said action of initiating a transition of said assembly from said first condition to said second condition includes actuating one or more control devices operatively associated with at least one of said assembly and said pressurized gas system to transfer pressurized gas within said assembly.

16. A method according to claim 15, wherein said action of initiating a transition of said assembly from said first condition to said second condition includes receiving a signal triggering initiation of said transition.

17. A method according to claim 14, wherein said action of initiating a transition of said assembly from said second condition to said first condition includes actuating one or more control devices operatively associated with at least one of said assembly and said pressurized gas system to transfer pressurized gas within said assembly.

18. A method according to claim 17, wherein said action of initiating a transition of said assembly from said second condition to said first condition includes receiving a signal triggering initiation of said transition.

19. A method according to claim 14, wherein said action of providing a gas spring and gas damper assembly includes providing a gas spring and a gas damper;

said gas spring including:

a flexible spring member having a longitudinal axis and including a flexible wall extending longitudinally between first and second ends and peripherally about said axis to at least partially define a spring chamber;

a first end member secured across said first end of said flexible spring member such that a substantially fluid-tight seal is formed therebetween; and, a second end member disposed in spaced relation to said first end member and secured across said second end of said flexible spring member such that a substantially fluid-tight seal is formed therebetween, said second end member including an end member wall having an outside surface dimensioned for abutting engagement with said flexible wall of said flexible spring member and an inside surface at least partially defining an end member cavity; and, said gas damper including:

an inner sleeve extending longitudinally between opposing sleeve ends, said inner sleeve including a sleeve wall with an inner surface and an outer surface, said inner sleeve at least partially received within said end member cavity such that said outer surface of said sleeve wall is disposed in facing relation to said inside surface of said end member wall, said inner surface of said sleeve wall at least partially defining a damping chamber; and, a damper piston assembly including a damper piston and an elongated damper rod operatively connected to said damper piston, said damper piston positioned within said damping chamber and including an outer side wall disposed adjacent said inner surface of said inner sleeve, said damper piston separating said piston chamber into first and second chamber portions with at least one of said first and second chamber portions disposed in fluid communication with said spring chamber through one or more elongated damping passages that are capable of providing pressurized gas damping;

said damper rod operatively connected to said first end member such that upon extension and compression of said gas spring and gas damper assembly, said damper piston is reciprocally displaced within said damping chamber.

20. A method according to claim 14, wherein said action of providing a gas spring and gas damper assembly include said one or more elongated damping passages extending helically around said first and second chamber portions.

* * * * *